US012369180B2

(12) United States Patent
Wang et al.

(10) Patent No.: US 12,369,180 B2
(45) Date of Patent: Jul. 22, 2025

(54) USER EQUIPMENT AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 663 days.

(21) Appl. No.: 17/421,352

(22) PCT Filed: Jan. 10, 2019

(86) PCT No.: PCT/CN2019/071197
§ 371 (c)(1),
(2) Date: Jul. 7, 2021

(87) PCT Pub. No.: WO2020/142992
PCT Pub. Date: Jul. 16, 2020

(65) Prior Publication Data
US 2021/0400681 A1  Dec. 23, 2021

(51) Int. Cl.
*H04W 72/56* (2023.01)
*H04W 72/02* (2009.01)
*H04W 72/0446* (2023.01)
*H04W 72/0453* (2023.01)
(Continued)

(52) U.S. Cl.
CPC .......... *H04W 72/56* (2023.01); *H04W 72/02* (2013.01); *H04W 72/0446* (2013.01); *H04W 72/0453* (2013.01); *H04W 72/1263* (2013.01); *H04W 72/20* (2023.01)

(58) Field of Classification Search
CPC ..... H04W 72/56; H04W 72/20; H04W 72/02; H04W 72/0446; H04W 72/0453; H04W 72/1263
See application file for complete search history.

(56) References Cited

U.S. PATENT DOCUMENTS

2014/0098761 A1   4/2014  Lee et al.
2017/0347394 A1  11/2017  Yasukawa et al.
(Continued)

FOREIGN PATENT DOCUMENTS

| JP | 2015537422 A | 12/2015 |
| WO | WO 2016076301 A1 | 5/2016 |
| WO | WO 2018137452 A1 | 8/2018 |

OTHER PUBLICATIONS

International Search Report, mailed Sep. 26, 2019, for corresponding International Application No. PCT/CN2019/071197, 2 pages.
(Continued)

*Primary Examiner* — Natasha W Cosme
(74) *Attorney, Agent, or Firm* — Seed IP Law Group LLP

(57) ABSTRACT

Provided are a user equipment and wireless communication methods related to resource configuration for sidelink communication, sidelink discovery or any other sidelink operation in NR. The user equipment, comprising a transmitter, operative to transmit a Physical Sidelink Control Channel (PSCCH) or Physical Sidelink Shared Channel (PSSCH), and a receiver, operative to receive a Physical Sidelink Feedback Channel (PSFCH) associated with the transmitted PSCCH or PSSCH in a resource determined at least partially according to the resource for transmitting the PSCCH or PSSCH.

9 Claims, 24 Drawing Sheets

UE3's transmission and reception situation

(51) Int. Cl.
*H04W 72/1263* (2023.01)
*H04W 72/20* (2023.01)

(56) References Cited

U.S. PATENT DOCUMENTS

| 2019/0349895 | A1  | 11/2019 | Liu et al. |          |
|--------------|-----|---------|------------|----------|
| 2020/0029318 | A1* | 1/2020  | Guo        | H04L 1/1822 |
| 2020/0205166 | A1* | 6/2020  | Huang      | H04W 76/27 |

OTHER PUBLICATIONS

LG Electronics, "Feature lead summary for agenda item 7.2.4.1.2 Physical layer procedures," R1-1813938, Agenda Item: 7.2.4.1.2, 3GPP TSG RAN WG1 Meeting #95, Spokane, USA, Nov. 12-16, 2018, 12 pages.

Qualcomm Incorporated, "Considerations on Physical Layer aspects of NR V2X," R1-1811261, Agenda item: 7.2.4.1.2, 3GPP TSG RAN WG1 Meeting #94bis, Chengdu, China, Oct. 8-12, 2018, 11 pages.

Vivo, "Physical layer procedure for NR sidelink," R1-1812307, Agenda Item: 7.2.4.1.2, 3GPP TSG RAN WG1 Meeting #95, Spokane, USA, Nov. 12-16, 2018, 8 pages.

Qualcomm Incorporated, "Considerations on Physical Layer aspects of NR V2X," R1-1813421, Agenda Item 7.2.4.1.1, 3GPP TSG RAN WG1 Meeting #95, Spokane, USA, Nov. 12-16, 2018, 16 pages.

Spreadtrum Communications, "Consideration on physical layer procedures," R1-1813075, Agenda Item: 7.2.4.1.2, 3GPP TSG RAN WG1 Meeting #95, Spokane, USA, Nov. 12-16, 2018, 5 pages.

Partial Supplementary European Search Report, dated Dec. 14, 2021, for European Application No. 19909106.7-1205, 16 pages.

* cited by examiner

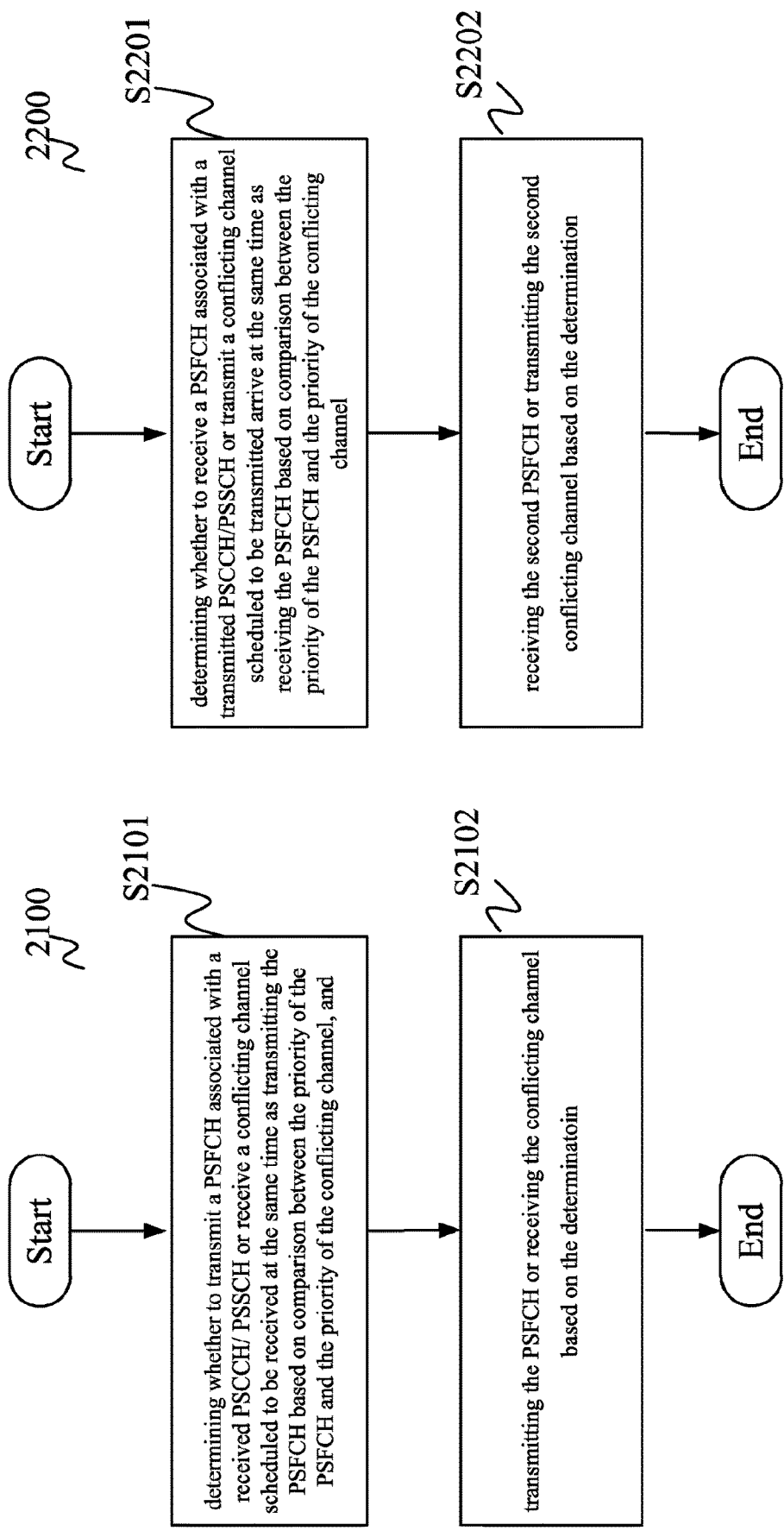

USER EQUIPMENT AND WIRELESS COMMUNICATION METHOD

BACKGROUND

1. Technical Field

The present disclosure relates to wireless communication field, and in particular, to user equipments (UEs), and wireless communication methods related to Physical Sidelink Feedback Channel (PSFCH) design for New Radio (NR) sidelink.

2. Description of the Related Art

Physical Sidelink Feedback Channel (PSFCH) concept is adopted for automatic repeat request feedback in groupcast and unicast based transmission of New Radio (NR) V2X (Vehicle to anything). Half duplex issue exists for NR V2X. That is to say a user equipment cannot transmit and receive simultaneously in one or more carriers. Such a half-duplex issue is due to large interference between transmitter and receiver.

In LTE V2X, the half-duplex issue is solved by randomized retransmission. Specifically, in LTE V2X, sidelink channel is transmitted in one or more repetitions, and even if there is a collision on the initial transmission of the Physical Sidelink Control Channel (PSCCH) or Physical Sidelink Shared Channel (PSSCH), the receiving user equipment can receive the packet based on the reception of randomized retransmission of PSCCH/PSSCH transmitted from the transmitting user equipment without collision. So far, PSFCH discussion in NR is still in an initial phase, and how to indicate the position of PSFCH in time and frequency domain in carriers in order to save overhead, solution for collision of PSFCHs and configuration of the PSFCH are being discussed.

SUMMARY

One non-limiting and exemplary embodiment facilitates determining the resource for sidelink communication, sidelink discovery or any other sidelink operation in NR to guarantee the system performance.

In an embodiment of the present disclosure, the techniques disclosed here include a user equipment, comprising: a transmitter, operative to transmit a Physical Sidelink Control Channel (PSCCH) or Physical Sidelink Shared Channel (PSSCH); and a receiver, operative to receive a Physical Sidelink Feedback Channel (PSFCH) associated with the transmitted PSCCH or PSSCH in a resource determined at least partially according to the resource for transmitting the PSCCH or PSSCH.

In another embodiment of the present disclosure, the techniques disclosed here is a user equipment, comprising: a transceiver, operative to transmit a first Physical Sidelink Feedback Channel (PSFCH) associated with a received Physical Sidelink Control Channel (PSCCH) or Physical Sidelink Shared Channel (PSSCH), or receive a second PSFCH associated with a transmitted PSCCH or PSSCH; and circuitry, operative to determine whether to transmit the first PSFCH or receive a first conflicting channel scheduled to be received at the same time as transmitting the first PSFCH based on comparison between the priority of the first PSFCH and the priority of the first conflicting channel, or determine whether to receive the second PSFCH or transmit a second conflicting channel scheduled to be transmitted arrive at the same time as receiving the second PSFCH based on comparison between the priority of the second PSFCH and the priority of the second conflicting channel.

In another embodiment of the present disclosure, the techniques disclosed here is a user equipment, comprising: a transmitter, operative to transmit a Physical Sidelink Control Channel (PSCCH) or Physical Sidelink Shared Channel (PSSCH); and a receiver, operative to receive a Physical Sidelink Feedback Channel (PSFCH), wherein the PSFCH is allocated in same resource pool as that of the PSCCH or PSSCH.

In another embodiment of the present disclosure, the techniques disclosed here is a wireless communication method for a user equipment, comprising: transmitting a Physical Sidelink Control Channel (PSCCH) or Physical Sidelink Shared Channel (PSSCH); and receiving a Physical Sidelink Feedback Channel (PSFCH) associated with the transmitted PSCCH or PSSCH in a resource determined at least partially according to the resource for transmitting the PSCCH or PSSCH.

In another embodiment of the present disclosure, the techniques disclosed here is a wireless communication method for a user equipment, comprising: transmitting a first Physical Sidelink Feedback Channel (PSFCH) associated with a received Physical Sidelink Control Channel (PSCCH) or Physical Sidelink Shared Channel (PSSCH), or receive a second PSFCH associated with a transmitted PSCCH or PSSCH; and determining whether to transmit the first PSFCH or receive a first conflicting channel scheduled to be received at the same time as transmitting the first PSFCH based on comparison between the priority of the first PSFCH and the priority of the first conflicting channel, or determining whether to receive the second PSFCH or transmit a second conflicting channel scheduled to be transmitted arrive at the same time as receiving the second PSFCH based on comparison between the priority of the second PSFCH and the priority of the second conflicting channel.

In another embodiment of the present disclosure, the techniques disclosed here is a wireless communication method for a user equipment, comprising: transmitting a Physical Sidelink Control Channel (PSCCH) or Physical Sidelink Shared Channel (PSSCH); and receiving a Physical Sidelink Feedback Channel (PSFCH), wherein the PSFCH is allocated in same resource pool as that of the PSCCH or PSSCH.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 21 illustrates another example of a flowchart of communication method performed by a user equipment according to an embodiment of the present disclosure;

FIG. 22 illustrates another example of a flowchart of communication method performed by a user equipment according to an embodiment of the present disclosure;

DETAILED DESCRIPTION

Figure 1:
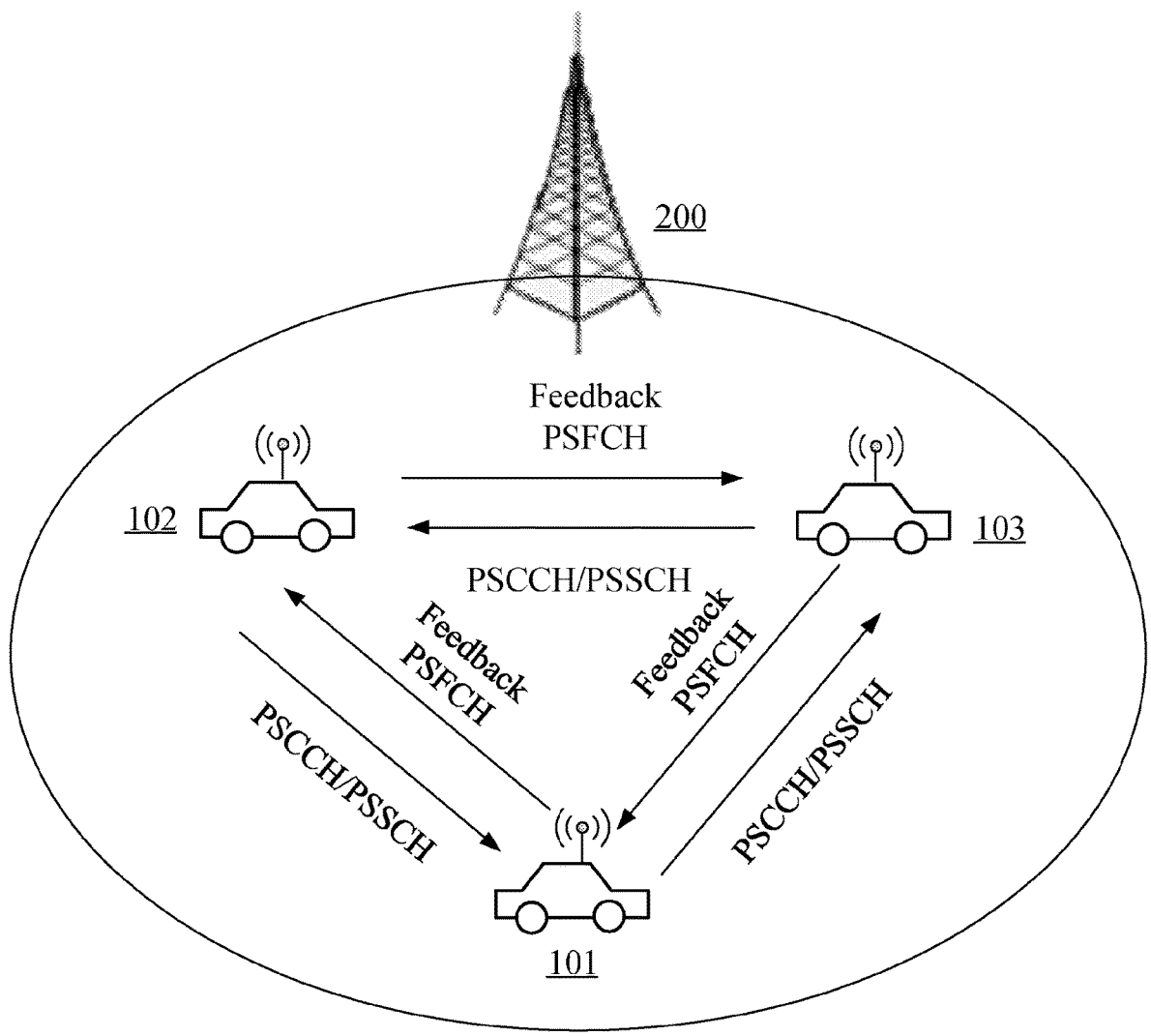
FIG. 1 schematically shows an exemplary scenario of sidelink transmission in NR V2X.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In an embodiment of the present disclosure, there is provided an exemplary scenario of sidelink transmission in NR V2X as shown in FIG. 1. In FIG. 1, communication can be performed among vehicles 101, 102 and 103 via sidelink transmission. Specifically, vehicle 101 transmits PSCCH/PSSCH to vehicle 103, and in response, vehicle 103 transmits PSFCH back to the vehicle 101 in order to acknowledge vehicle 101 the reception of the PSCCH/PSSCH. Similar processes apply to the communications between vehicles 103 and 102 and between vehicles 102 and 101. Here in FIG. 1, the sidelink is shown as one direction (i.e., vehicle 101 to vehicle 103, vehicle 103 to vehicle 102, and vehicle 102 to vehicle 101), which is for the purpose of exemplary illustration, and it should be noted that each vehicle can perform transmission and reception of PSCCH/PSSCH/PSFCH as a transmitting vehicle and receiving vehicle to any of the other vehicle. Such a sidelink communication may or may not be performed based on the controlling information from the base station 200, as specified in each of the below embodiments.

Figure 2:
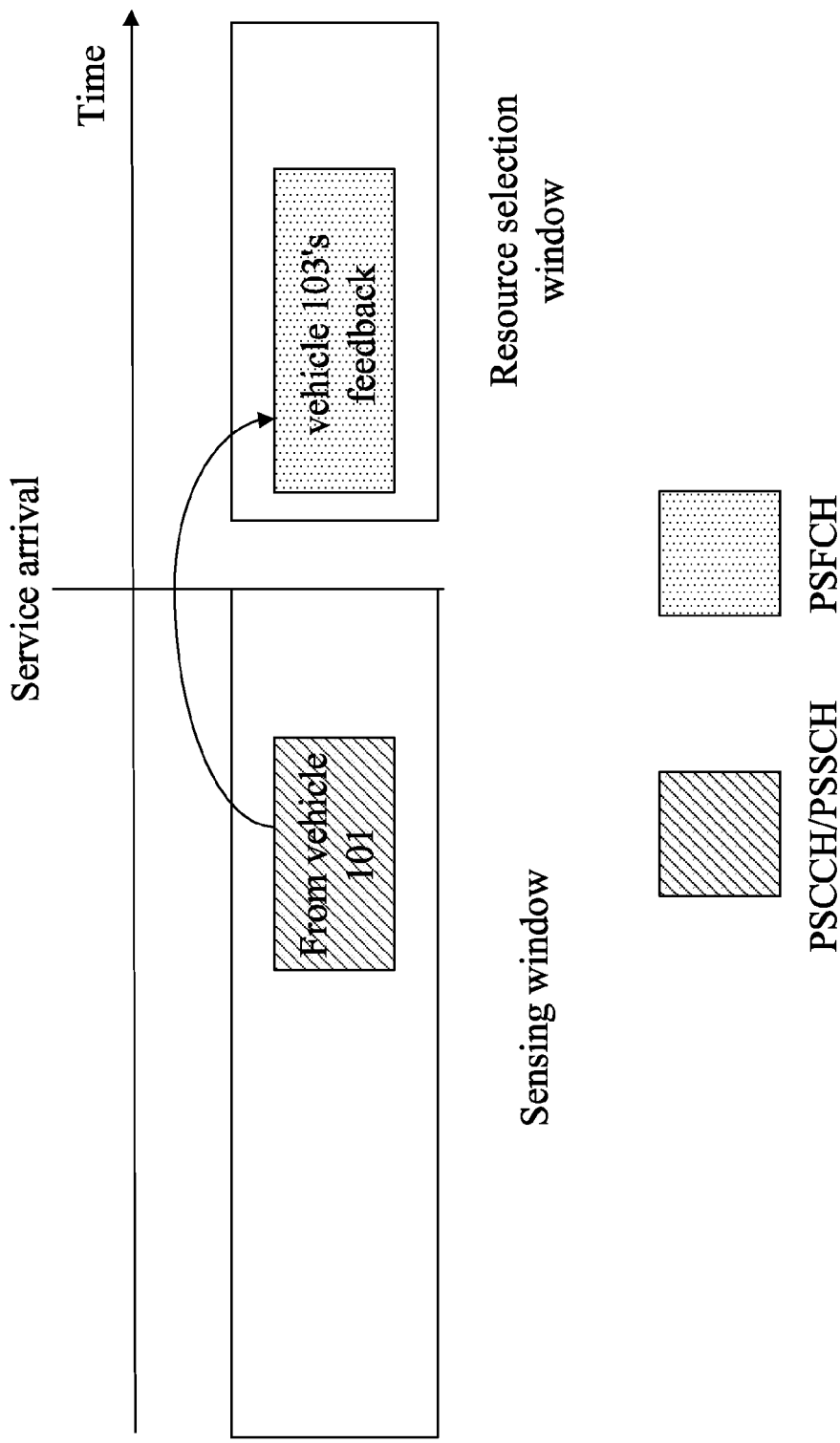
FIG. 2 illustrates a block diagram of determining PSFCH resource in sidelink transmission in NR V2X.

To be more specific, refer to FIG. 2. FIG. 2 illustrates a block diagram about how to determine other UE's PSFCH resource which will impact transmission resource selection. Taking vehicle 103 in the exemplary scenario of FIG. 1 as an example, it will select resources for PSCCH/PSSCH transmission. As shown in FIG. 2, vehicle 103 receives PSCCH and/or PSSCH from vehicle 101 in the sensing window, during which vehicle 103 receives control channel and determines the interference in the following symbols or slots based on the PSCCH and/or PSSCH. Vehicle 103 then identifies that vehicle 103 will transmit a PSFCH associated with the received PSCCH and/or PSSCH in order to acknowledge vehicle 101 the reception of the PSCCH/PSSCH in the resource selection window, during which the vehicle 103 may select resource for later transmission of PSCCH and/or PSSCH and transmit PSFCH. The specific resource for PSFCH may be based on fixed or specified HARQ timing rules. As PSFCH's inference may not be known, vehicle 103 would preclude the resource used for transmitting PSFCH from the resource used for PSCCH/PSSCH transmission in the resource selection window.

Figure 3:
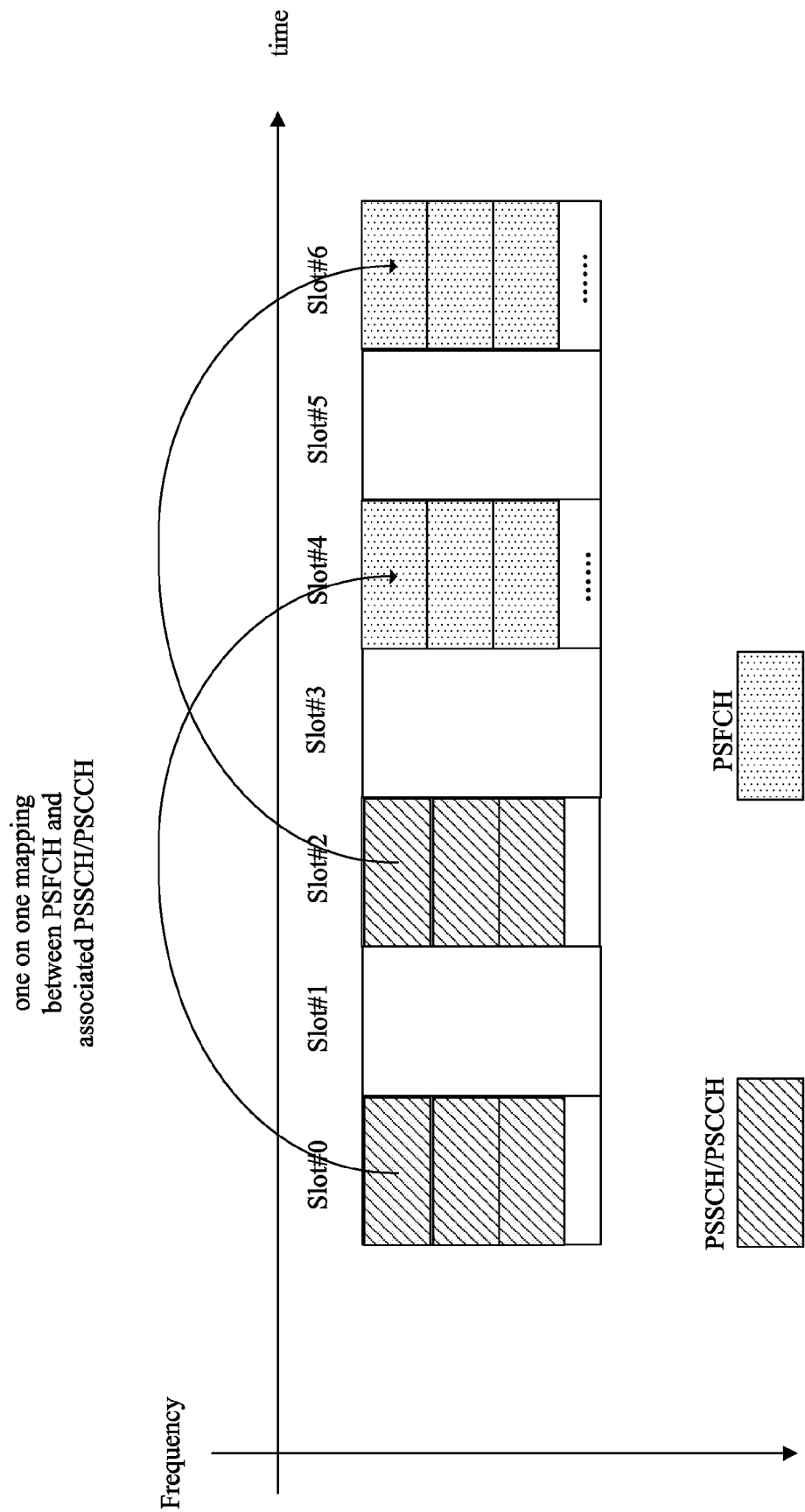
FIG. 3 illustrates a block diagram of details of mapping between PSFCHs and their associated PSSCH/PSCCH in sidelink transmission in NR V2X in time domain.

In between PSSCH/PSFCH and the associated PSFCH, there is a one-on-one mapping, as shown in FIG. 3. FIG. 3 illustrates a block diagram of details of mapping between PSFCH and its associated PSSCH/PSCCH in sidelink transmission in NR V2X in time domain. Each of the PSSCH and PSCCH has its corresponding PSFCH for acknowledging the reception/decoding status of the associated PSSCH/PSCCH. In the example of FIG. 3, a vehicle transmits a PSSCH or PSCCH in slot #0 and receives the PSFCH associated of the transmitted PSSCH or PSCCH in slot #4. Similarly, the vehicle transmits a PSSCH or PSCCH in slot #2 and receives the PSFCH associated of the transmitted PSSCH or PSCCH in slot #6. Note that both transmissions of PSSCH/PSCCH and receptions of PSFCH can have repetitions or have no repetitions, and detailed descriptions will be given in below embodiments.

Figure 4:
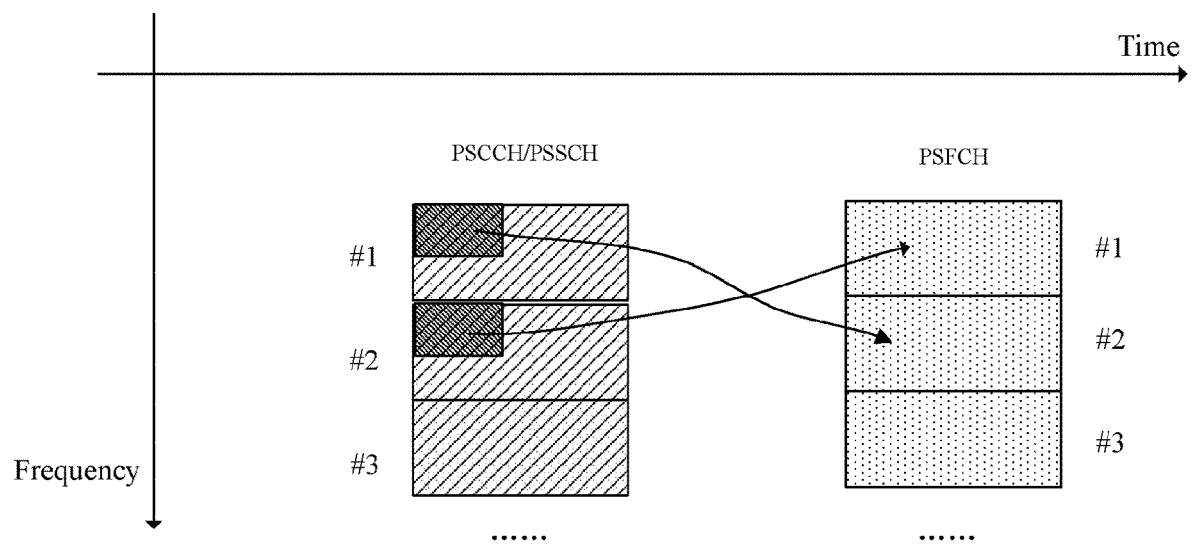
FIG. 4 illustrates a block diagram of details of correspondence between a PSFCH and its associated PSSCH/PSCCH in sidelink transmission in NR V2X.

In addition, for each PSCCH/PSSCH, its frequency position is also mapped with the frequency position of the associated PSFCH. Referring to FIG. 4, for instance, the PSCCH included in the resource of frequency portion #1 can correspond to the acknowledge information PSFCH in the resource of frequency portion #2 (e.g., PRB #2) and the PSCCH included in resource of frequency portion #2 can correspond to acknowledge information PSFCH in the resource of frequency portion #1 (e.g., PRB #1). Please note that the unit of correspondence of the location is not limited to PRB, depending on the granularity.

Figure 5A:
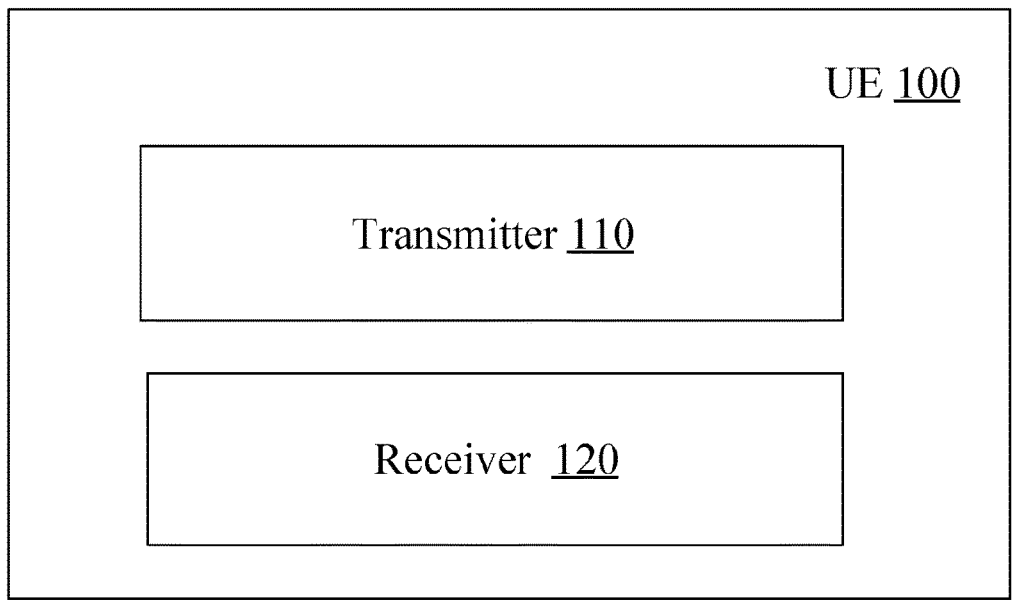
FIG. 5a illustrates a block diagram of a user equipment (UE) according to an embodiment of the present disclosure.

FIG. 5a illustrates a block diagram of a user equipment (UE) 100 according to an embodiment of the present disclosure. Here UE 100 can refer to any one of the vehicles 101, 102 and 103 or any other V2X terminals. The UE 100 comprises a transmitter 110, operative to transmit a PSCCH or PSSCH, and a receiver 120, operative to receive a PSFCH associated with the transmitted PSCCH or PSSCH in a resource determined at least partially according to the resource for transmitting the PSCCH or PSSCH. Here, the term "a source determined at least partially according to" refers to the cases of a source determined solely according to the resource for transmitting the PSCCH or PSSCH, a source determined according to the resource for transmitting the PSCCH or PSSCH and for example controlling information from the gNB or transmitting UE.

In particular, the transmitter 110 of the UE 100 can transmit a PSCCH or PSSCH to a target user equipment via sidelink transmission. Once the target user equipment receives the PSCCH or PSSCH transmitted by the UE 100, it will send a PSFCH to the UE 100. The PSFCH is transmitted on a resource and the resource is determined according to the resource for the PSCCH or PSSCH transmitted from the UE 100 to the target user equipment. Meanwhile, the receiver 120 of the UE 100 will receive the PSFCH transmitted from the target user equipment to the UE 100 in the resource determined according to the resource for the PSCCH or PSSCH.

With the above embodiment of the present disclosure, the user equipment could receive the PSFCH in the resource determined based on the resource for transmitting the PSCCH or PSSCH, without need for the base station or user equipment to indicate resource position information of the PSFCH. In this way, the resource overhead becomes less.

Figure 5B:
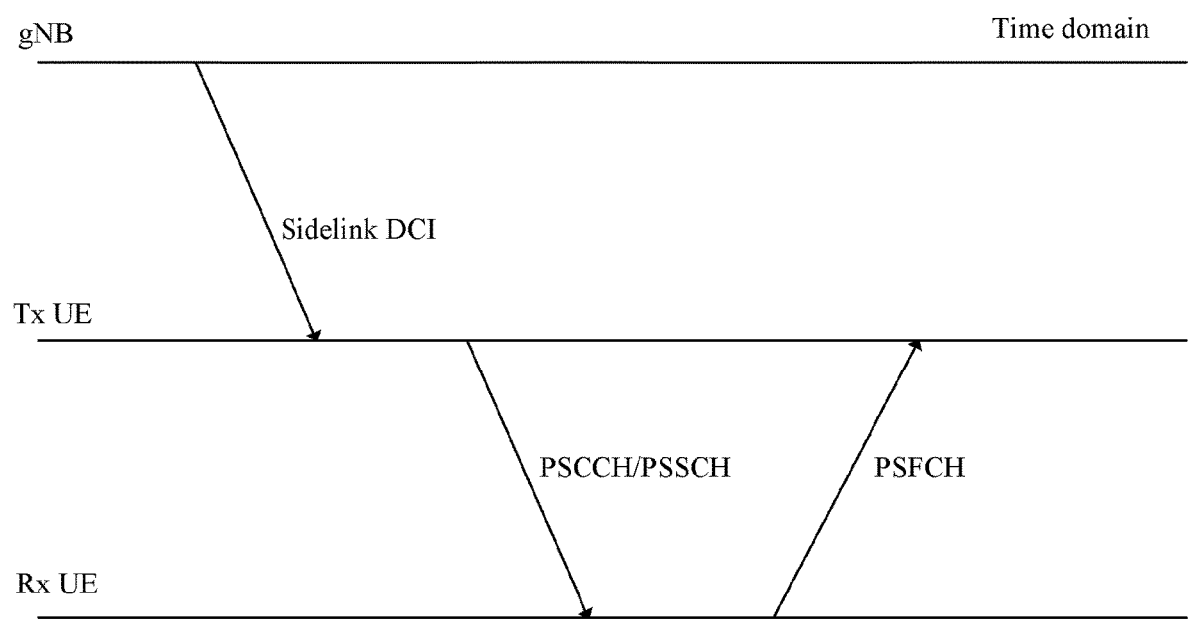
FIG. 5b schematically shows an exemplary scenario of sidelink communication according to an embodiment of the present disclosure.

The embodiments of the present disclosure can also apply to the scenario as shown in FIG. 5b. FIG. 5b illustrates a scenario of where the sidelink communication between UEs (e.g., between UE 100 and a target UE as described in the embodiment above) are under the control of a base station (i.e., gNB). Specifically, the gNB can transmit a Sidelink Downlink Control Indicator (DCI) to a transmitting (Tx) UE (e.g., UE 100), wherein the Sidelink DCI may include controlling information for sidelink communication. After the transmitting UE receives the Sidelink DCI, it can transmit a Sidelink Control Indicator (SCI) included in the PSCCH to the receiving (Rx) UE to indicate the controlling information for the transmissions of for example PSSCH (Here, the transmission of PSCCH can be followed by the transmission of the PSSCH or at the same time as the transmission of the PSSCH). In response, the receiving UE transmits a PSFCH to the transmitting UE as feedback for PSSCH reception. In the above scenario, PSFCHs can be transmitted or received on the resource determined according to the resource for the associated PSCCH/PSSCH regardless of the controlling information indicated by Sidelink DCI or SCI according to the embodiments of the present disclosure.

Figure 5C:
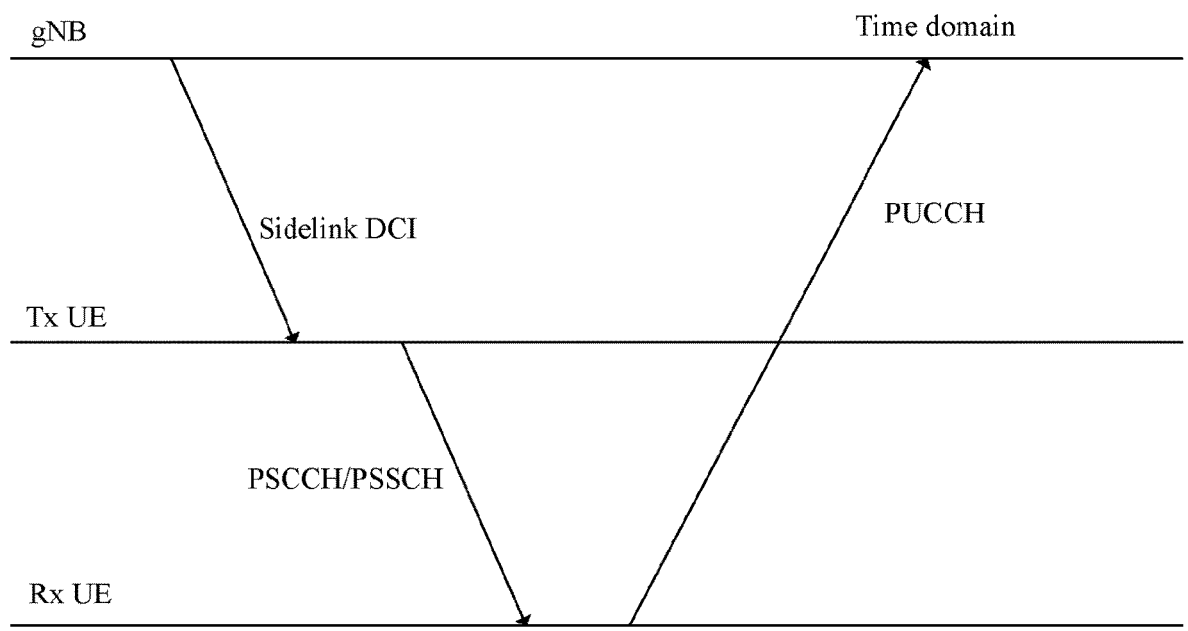
FIG. 5c schematically shows an exemplary scenario of sidelink communication according to an embodiment of the present disclosure.

In a further example, the embodiments of the present disclosure can apply to the scenario as shown in FIG. 5c. FIG. 5c illustrates another scenario of where the sidelink communication between the transmitting UE and the receiving UE are under the control of a base station (i.e., gNB). In this case, after the reception procedure of the PSSCH, the receiving UE transmits a HARQ-ACK as feedback to gNB via PUCCH for acknowledging gNB the reception of PSSCH from the transmitting UE. In the above scenario, the resource determination of PUCCH, similar to PSFCH described in other embodiments of the present disclosure, can be based on the associated PSCCH/PSSCH transmitted by transmitting UE regardless of the controlling information indicated by Sidelink DCI or SCI according to the embodiments of the present disclosure.

Figure 6:
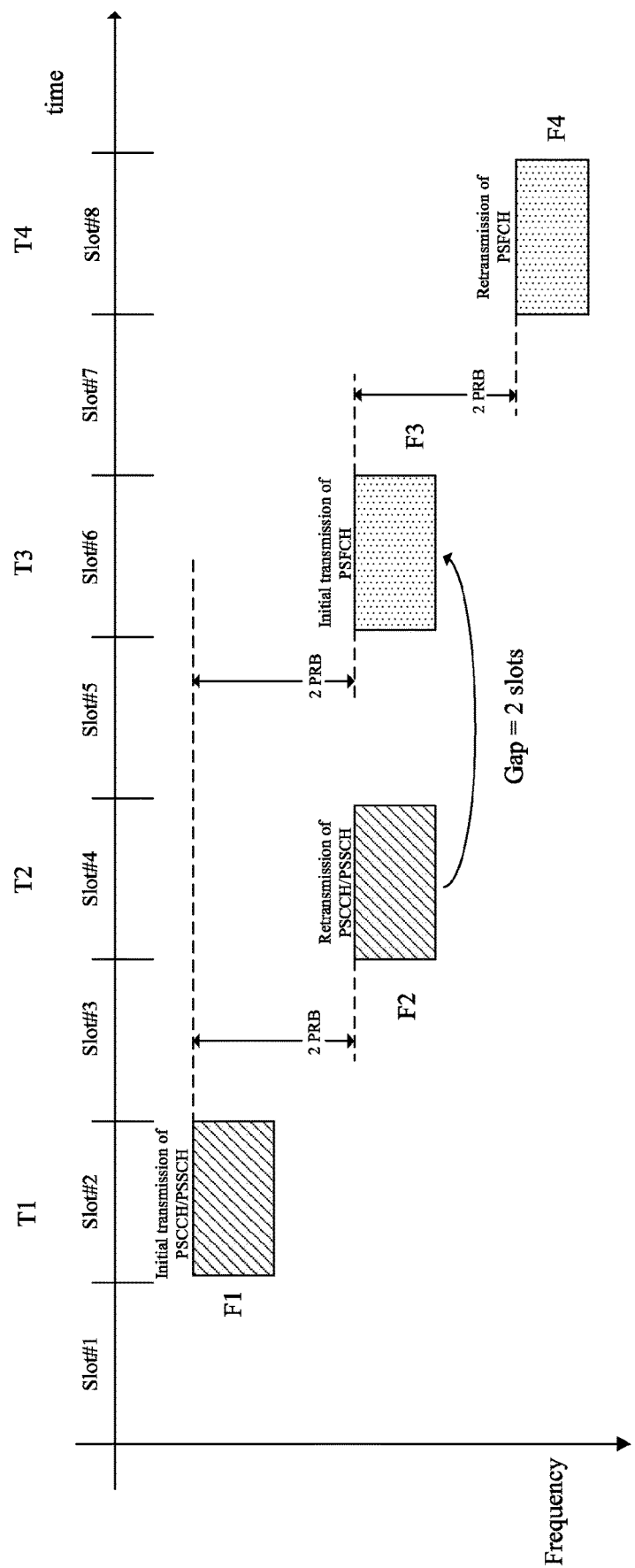
FIG. 6 schematically shows an exemplary scenario of PSFCH reception according to an embodiment of the present disclosure.

FIG. 6 schematically shows an exemplary scenario of PSFCH reception according to an embodiment of the present disclosure. From FIG. 6, the transmission of PSFCH from the target user equipment is in the resource of determined by the last transmission of the PSCCH/PSSCH (e.g., retransmission of the PSCCH/PSSCH). In particular, the resource in time domain for the PSFCH is in a gap of one or more symbols or slots from the resource in time domain for the associated PSCCH or PSSCH, and the resource in frequency domain for the PSFCH is in a gap of one or more Physical Resource Blocks (PRBs) from the resource in frequency domain for the associated PSCCH or PSSCH. Here the term of "gap" can refer to the difference between the starting position of the PSCCH/PSSCH to the starting position of the PSFCH, the difference between the starting position of the PSCCH/PSSCH to the ending position of the PSFCH, the difference between the ending position of the PSCCH/PSSCH to the ending position of the PSFCH, or the difference between the ending position of the PSCCH/PSSCH to the starting position of the PSFCH in time domain or frequency domain. The number of symbols or slots can be pre-configured, configured, specified or any combination thereof in accordance with the standard and the number of PRBs can be pre-configured, configured, specified or any combination thereof in accordance with the standard.

In the embodiments according to the present disclosure, a parameter "can be pre-configured, configured, specified or any combination thereof in accordance with the standard" refers to the case that such parameter "can be pre-configured in the user equipment, configured by the base station or particularly specified in accordance with the standard or any combination thereof".

For example, as shown in FIG. 6, the resource for the PSFCH is in a gap of, for example 2 slots (i.e., slot #6–slot #4=2 slots), and at the same PRB (i.e., F3=F2) from the resource for the associated PSCCH or PSSCH. In the case that there are repetitions of transmission of PSCCH/PSSCH, the at least one of the starting slot and Physical Resource Block (PRB) of the resource for the initial transmission of the PSFCH can be determined by resource position of initial transmission and/or retransmission of the associated PSCCH or PSSCH. for example, the transmission of PSFCH is in a gap of, for example 2 slot, from the last slot of the retransmission of the associated PSCCH/PSSCH (i.e., slot #6−slot #4=2 slots), and the transmission of PSFCH is in a gap of 2 PRB from the last PRB of the initial transmission of the associated PSCCH/PSSCH.

In an embodiment, the at least one of the starting slot and PRB of the resource for the initial transmission of the PSFCH is indicated by SCI received by the user equipment. With the above embodiment, the resource overhead can be reduced to only indicating the resource position of initial PSFCH without need to indicate the resource positions of repetitions thereof and the PSFCH can be more flexibly set at each time of the transmission in accordance with the target user equipment.

In an embodiment, the number of symbols or slots for the gap between the initial transmission and the associated PSCCH/PSSCH can be pre-configured, configured, specified or any combination thereof in accordance with the standard. Similarly, the number of PRBs can be pre-configured, configured, specified or any combination thereof in accordance with the standard.

In the case that there are repetitions of PSFCH and PSCCH/PSSCH, the timing gap between the PSFCH and its repetition can be the same as the timing gap between the associated PSCCH or PSSCH and its repetition (e.g., 2 slots). In an embodiment, the frequency gap between the PSFCH transmission and its repetition can be the same as the frequency gap between the associated PSCCH or PSSCH and its repetition (e.g., 2 PRBs). Here, the timing gap and/or frequency gap between the PSFCH and its repetition may be different for each UE. Please note that although FIG. 6 shows the case of retransmissions, the present disclosure is not limited to the case where the transmission of PSCCH/PSSCH or PSFCH has repetitions.

In an embodiment, the number of repetitions for PSFCH is the same as or in a relation derived from that for the associated PSCCH or PSSCH. For example, if the PSCCH/PSSCH is transmitted with 2 repetitions, the PSFCH can be transmitted with 2 repetitions (i.e., the same number of repetition as PSCCH/PSSCH) or with 4 repetitions (i.e., proportional to the number of the number of repetitions of PSCCH/PSSCH). Such proportion can be pre-configured, configured, specified or any combination thereof in accordance with the standard.

With the above embodiment of the present disclosure, in the case that there are repetitions of transmission for PSCCH/PSSCH and/or PSFCH, the user equipment could receive each PSFCH in the resource determined based on the resource for the associated PSCCH or PSSCH and its repetitions, and thereby the resource overhead for indicating the resource positions for PSFCH and its repetitions is saved.

Figure 7:
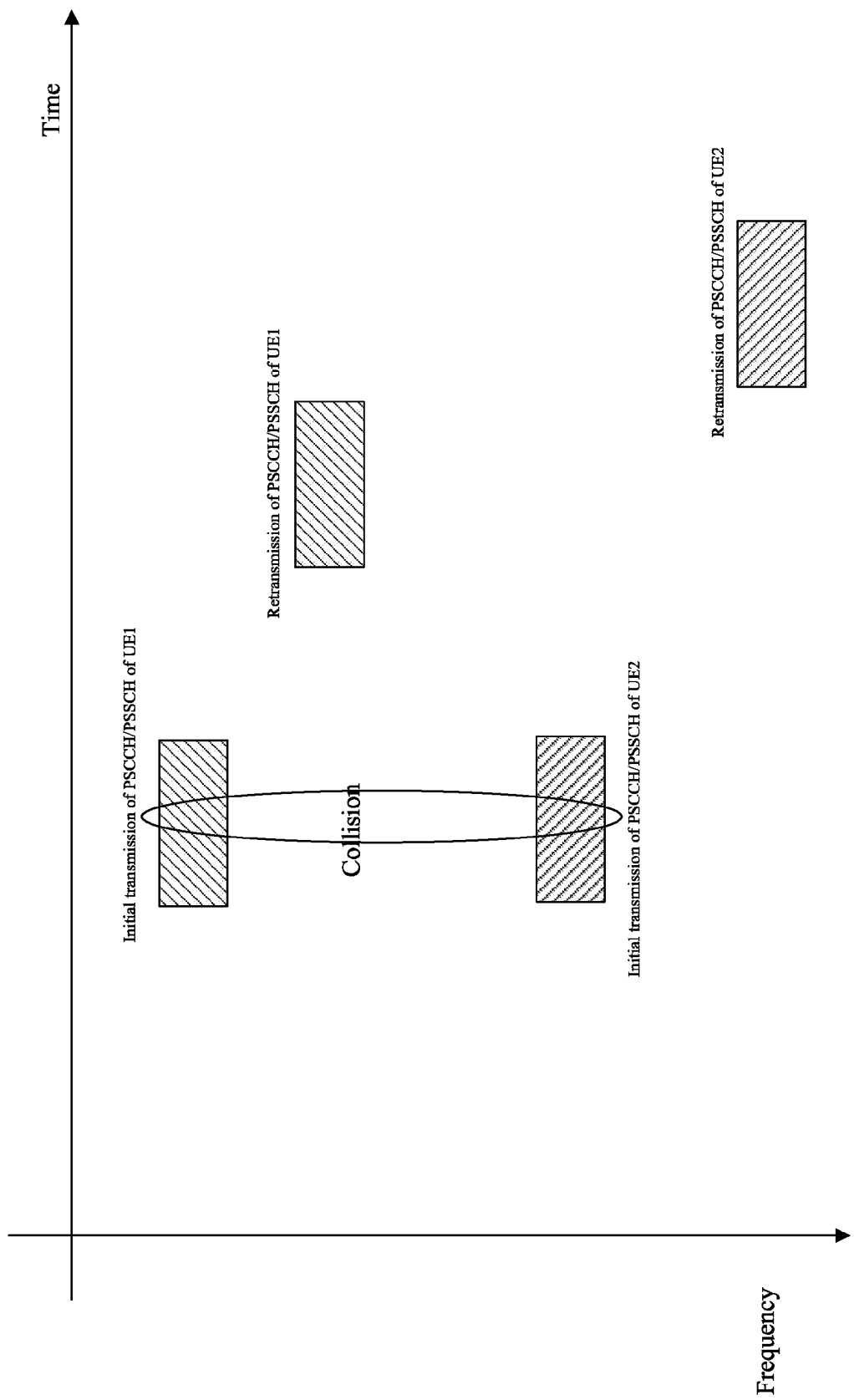
FIG. 7 illustrates a block diagram of randomized gap between initial transmission and retransmission of PSCCH/PSSCH.

FIG. 7 illustrates a block diagram of randomized gap between initial transmission and retransmission of PSCCH/PSSCH. Specifically, even the initial transmission of PSCCH/PSSCH of UE1 and the initial transmission of PSCCH/PSSCH of UE2 have collision, the retransmission of the PSCCH/PSSCH of UE1 and the retransmission of the PSCCH/PSSCH of UE2 would not have any collision in time domain due to a randomized gap between initial transmission and retransmission of PSCCH/PSSCH from UE1 and UE2.

Figure 8:
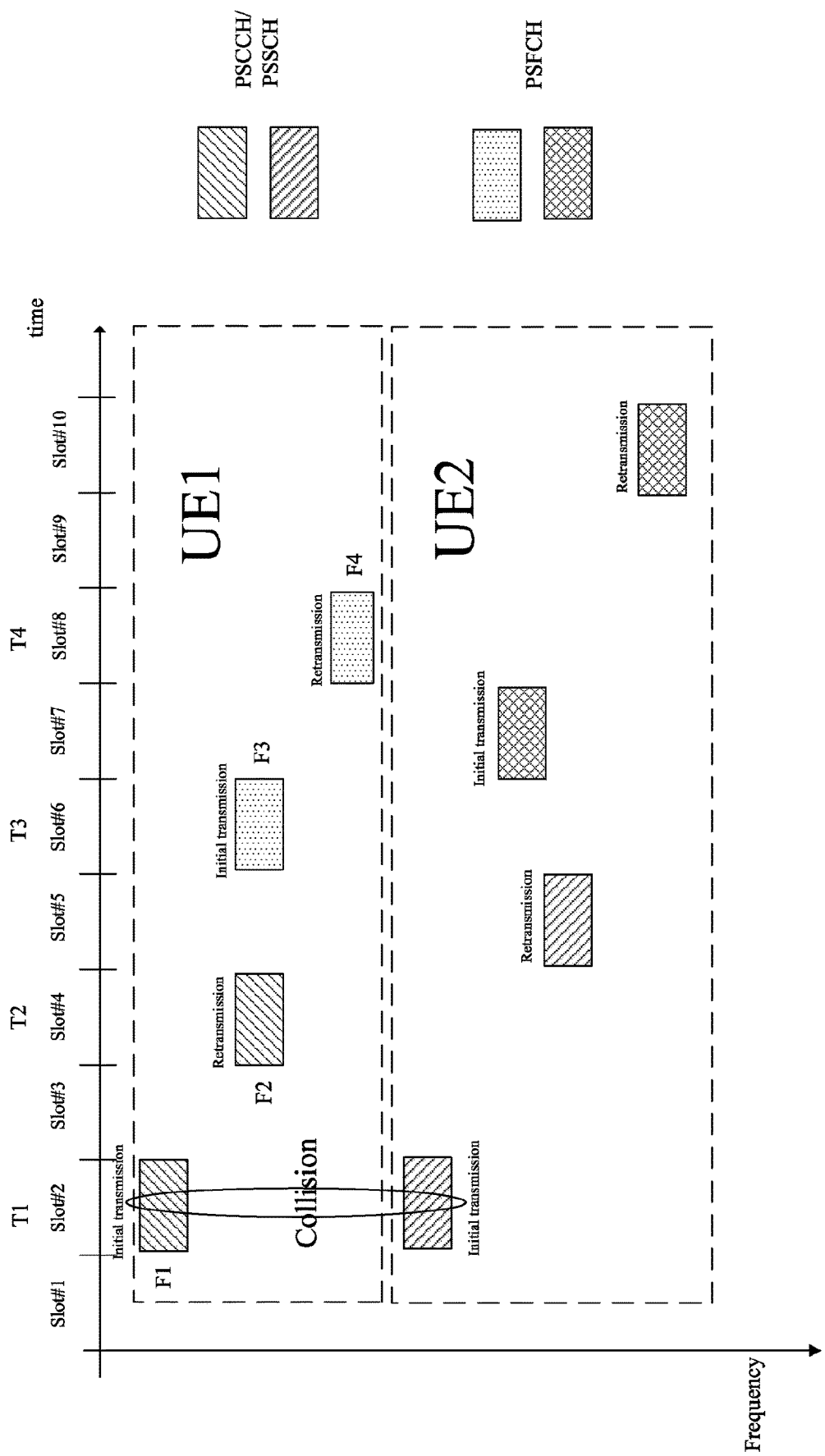
FIG. 8 schematically shows another exemplary scenario of PSFCH reception according to an embodiment of the present disclosure.

Based on the above randomized gap between initial transmission and retransmission of the PSCCH/PSSCH, the user equipment according to an embodiment of the present disclosure could also solve or provide an optimized solution to the problem of the collision of PSFCH reception/transmission. FIG. 8 schematically shows an exemplary scenario of PSFCH reception according to an embodiment of the present disclosure. Specifically, when the initial transmission of the PSCCH/PSSCH of UE1 has conflict with PSCCH/PSSCH of UE2, retransmissions of UE1 and UE2 would not have any collision due to randomization of the gap between initial transmission and retransmission of PSCCH/PSSCH, as described above. Since the resource for transmission of the PSFCH is determined according to the resource for the associated PSCCH/PSSCH, the transmissions of the PSFCH of UE1 and UE2 can also prevent collision accordingly. In addition, to further randomize the gap of repetitions of PSFCH, different UE's association relation between PSCCH/PSSCH and PSFCH may be differently pre-configured, configured or specified for example based on UE ID or RRC signaling.

To be more specific, refer to FIG. 8, when collision occurs for the initial transmission of PSCCH/PSSCH of UE1 and UE2 in slot #2, the retransmission of PSCCH/PSSCH of UE1 can be determined to be in, for example, slot #4, and the retransmission of PSCCH/PSSCH of UE2 can be determined to be in slot other than slot #4, for example slot #5. As described above, the resource for transmission of the PSFCH is in a gap of, for example 2 slots, from the resource for the last transmission of the PSCCH/PSSCH (i.e., retransmission of the PSCCH/PSSCH in this case). Hence the resource for transmission of PSFCH of UE1 would be in slot #6 (i.e., 2 slots from slot #4), and the transmission of PSFCH of UE2 will be in slot #7 (i.e., 2 slots form slot #5). the resource in frequency domain for PSFCH for UE1 is in a gap of, for example 4 PRBs, from the resource in frequency domain for PSCCH/PSSCH for UE1 (i.e., initial transmission of PSCCH/PSSCH for UE1 in FIG. 8) and the resource in frequency domain for PSFCH for UE2 is in a gap of, for example 4 PRBs, from the resource in frequency domain for PSCCH/PSSCH for UE2 (i.e., initial transmission of PSCCH/PSSCH for UE2 in FIG. 8).

For the case there are repetitions of PSFCH transmission, in an embodiment, the frequency gap between the PSFCH transmission and its repetition is the same as the frequency gap between the associated PSCCH or PSSCH and its repetition (e.g., 2 PRBs) and in an embodiment, the number of repetitions for PSFCH is the same as or in a relation derived from that for the associated PSCCH or PSSCH. As illustrated in FIG. 8, the resource for retransmission of PSFCH is 2 slots away from resource for its initial transmission in time domain, and the resource for retransmission of PSFCH is 4 PRBs away from resource for its initial transmission in time domain.

Figure 9:
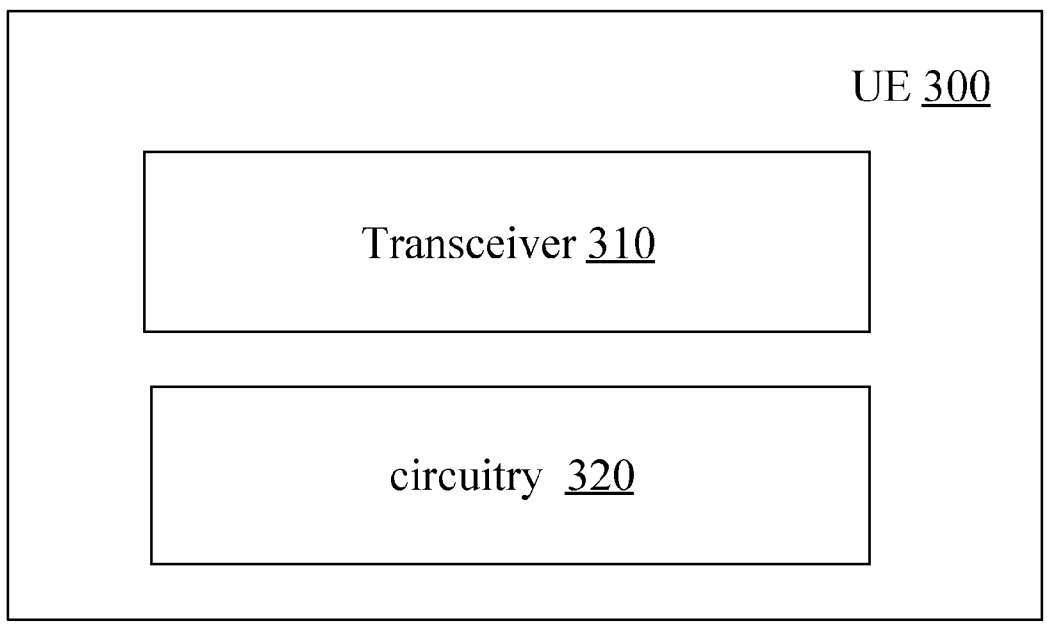
FIG. 9 illustrates a block diagram of a user equipment according to another embodiment of the present disclosure.

FIG. 9 illustrates a block diagram of a UE 300 according to another embodiment of the present disclosure. The UE 300 comprises a transceiver 310, operative to transmit a first Physical Sidelink Feedback Channel (PSFCH) associated with a received Physical Sidelink Control Channel (PSCCH) or Physical Sidelink Shared Channel (PSSCH), or receive a second PSFCH associated with a transmitted PSCCH or PSSCH; and circuitry 320, operative to determine whether to transmit the first PSFCH or receive a first conflicting channel scheduled to be received at the same time as transmitting the first PSFCH based on comparison between the priority of the first PSFCH and the priority of the first conflicting channel, or determine whether to receive the second PSFCH or transmit a second conflicting channel scheduled to be transmitted arrive at the same time as receiving the second PSFCH based on comparison between the priority of the second PSFCH and the priority of the second conflicting channel. Note that the transceiver 310 here can refer to a combination of a transmitter and a receiver with a similar configuration of the transmitter 110 and receiver 120 in FIG. 5*a*.

In the embodiments according to the present disclosure, a conflicting channel refers to a channel scheduled to be transmitted at the same time (e.g., in the time slot) as for example PSFCH or for which the scheduled transmission timing at least partially overlaps with for example PSFCH.

Specifically, when there will be collision between PSFCH transmission/reception and another channel, the circuitry 320 of the UE 300 determines the process to be performed in advance. In the case of collision in time domain between PSFCH transmission and reception of another channel, for example PSCCH/PSSCH or PSFCH, the circuitry 320 determines whether to transmit the PSFCH or receive the conflicting channel scheduled based on comparison between the priority of the PSFCH and the priority of the conflicting channel, prior to the collision time. Similarly, in the case of collision in time domain between PSFCH reception and transmission of another channel, for example PSCCH/PSSCH or PSFCH, the circuitry 320 determines whether to receive the PSFCH or transmit the conflicting channel scheduled based on comparison between the priority of the PSFCH and the priority of the conflicting channel, prior to the collision time. Once the circuitry 320 determines the process to be performed, the transceiver 310 can perform transmission or reception of PSFCH or the conflicting channel accordingly. In an embodiment, there is no repetition for PSFCH transmission, since concerns of collision is addressed by the determination process prior to the collision.

With the above embodiment, the user equipment according to the present disclosure is able to determine the transmission and reception of the PSFCH in order to prevent collision, even without repetitions of PSFCH, thereby reduce resources allocation for PSFCH.

Figure 10:
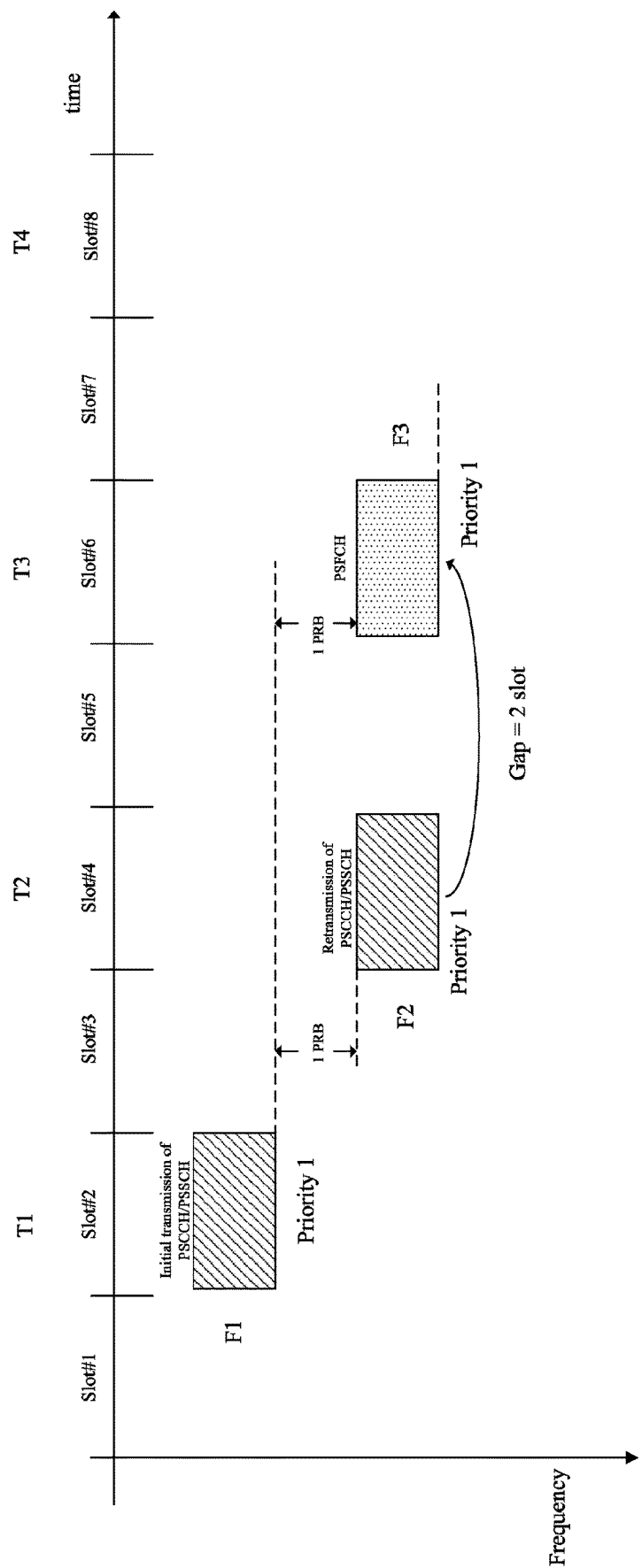
FIG. 10 schematically shows another exemplary scenario of PSFCH reception according to an embodiment of the present disclosure.

Referring now to FIG. 10, FIG. 10 schematically shows another exemplary scenario of PSFCH reception according to an embodiment of the present disclosure. In an embodiment, the priority of the PSFCH is determined based on the priority of the associated PSCCH or PSSCH, for example Priority 1 as shown. For example, in the above embodiment, the priority of the PSFCH to be transmitted is determined based on the priority of the associated PSCCH or PSSCH received by the UE 300, and the priority of the PSFCH to be received is determined based on the priority of the associated PSCCH or PSSCH transmitted from the UE 300.

With the above embodiment, the user equipment does not need to assign priority for each PSFCH prior to the transmission thereof since the priority of PSSCH/PSCCH could reflect the priority of the associated PSFCH in most time.

In an embodiment, the resource for transmitting or receiving the PSFCH is determined according to the resource for receiving or transmitting the associated PSCCH or PSSCH. Specifically, the resource position for transmitting or receiving PSFCH can be determined by the resource position of the associated PSCCH/PSSCH received or transmitted, respectively, and resource position of initial/retransmission of the associated PSCCH/PSSCH in the case that there are repetitions for PSCCH/PSSCH transmission, as described in above embodiments with details omitted.

In an embodiment, the priority of transmission is prioritized over reception when the priority of the channel to be transmitted is the same as that of the channel to be received. Note that the priority of transmission and reception with the same priority may vary based on the different configurations.

Figure 11:
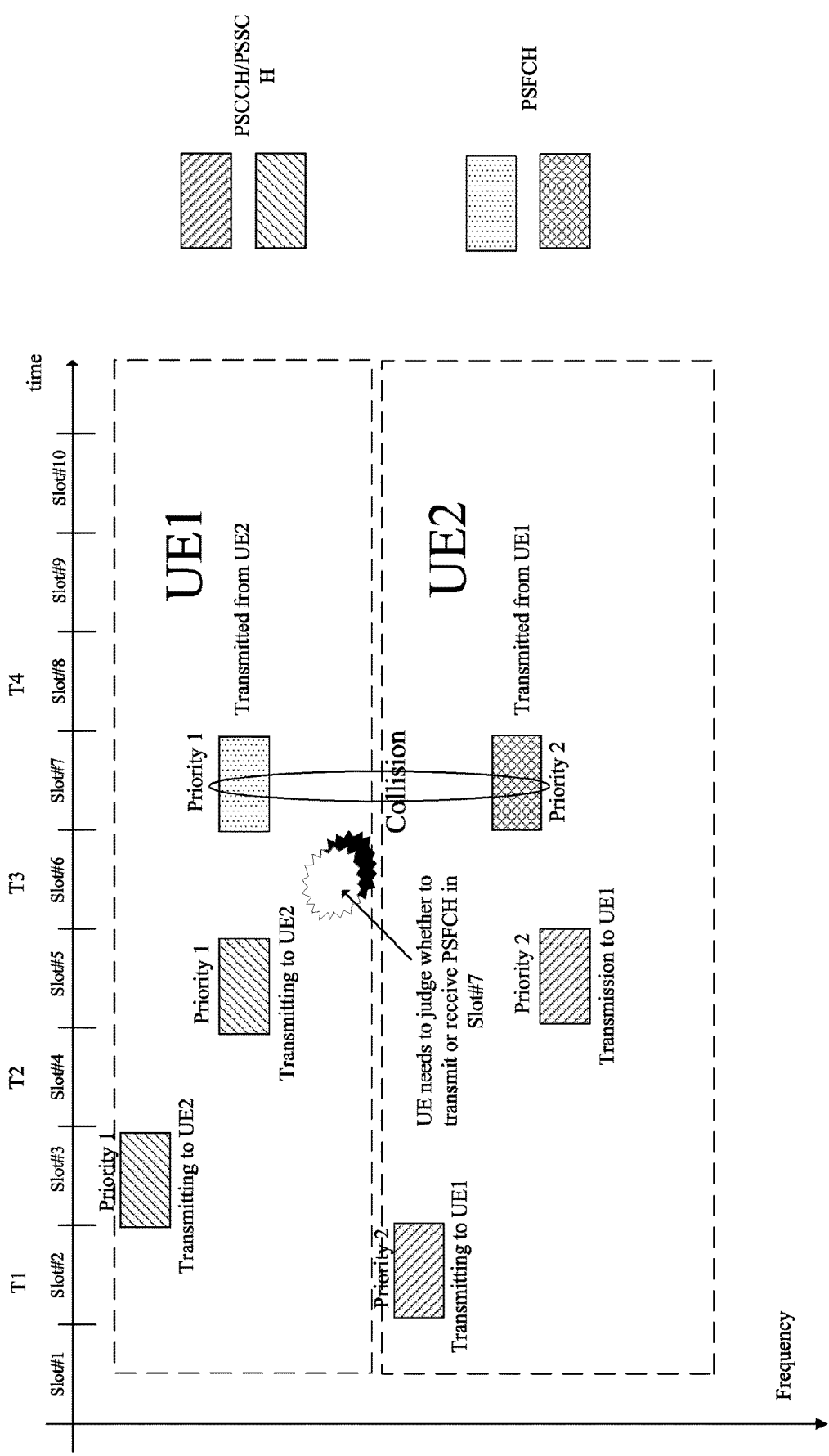
FIG. 11 schematically shows details of PSFCH reception according to an embodiment of the present disclosure.

FIG. 11 schematically shows details of PSFCH reception according to an embodiment of the present disclosure. Specifically, at for example slot #7, there will be collision between PSFCHs to be transmitted from UE1 and UE2, then the UE1, which corresponding to UE 300, determines, prior to slot #7 (e.g., slot #6), whether to receive PSFCH transmitted from UE2, or to transmit PSFCH to UE2 in slot #7. Similar process can be performed for UE2. Specifically, UE2 can determine, prior to slot #7 (e.g., slot #6), whether to receive PSFCH transmitted from UE1, or to transmit PSFCH to UE1 in slot #7. Here, the priority of PSFCH to be transmitted by UE1 has the same priority with the associated PSCCH/PSSCH received by UE1 (Priority 2), and the priority of PSFCH to be transmitted by UE2 has the same priority with the associated PSCCH/PSSCH received by UE2 (Priority 1). In this case, since PSFCH of UE2 has a higher priority (Priority 1) than PSFCH of UE1 (Priority 2), at slot #6, UE1 determines to receive PSFCH transmitted from UE2 and UE2 determines to transmit PSFCH to UE1.

Figure 12:
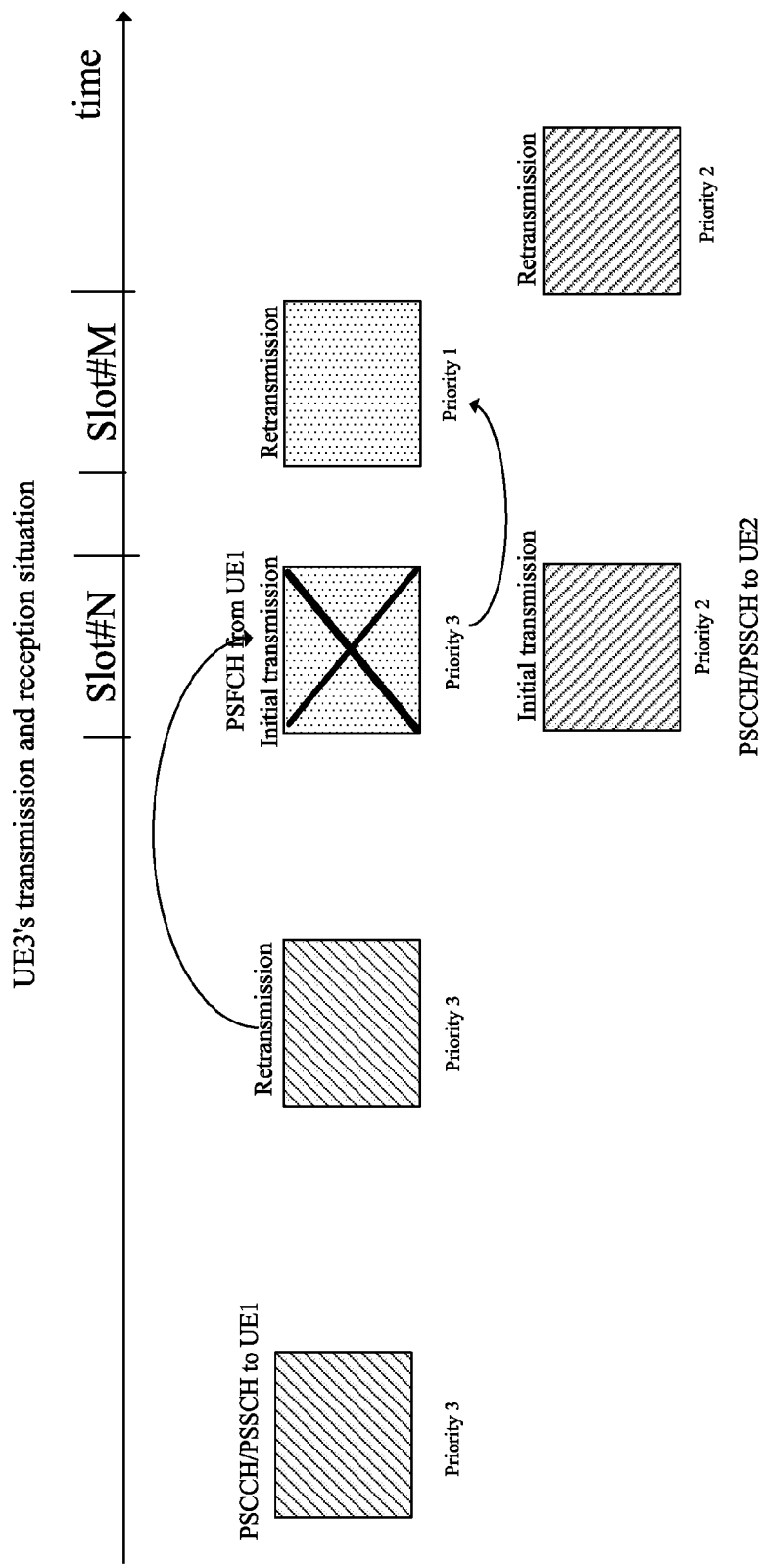
FIG. 12 schematically shows details of PSFCH reception according to an embodiment of the present disclosure.

FIG. 12 schematically shows details of PSFCH reception according to an embodiment of the present disclosure. In this case, a UE3 is described to transmit PSCCH/PSSCH to UE1 and UE2 and receive PSFCH from UE1 and UE2. At time slot #N, there will be collision between a PSFCH reception from UE1 (Priority 3) in response to the transmission of associated PSCCH/PSSCH to UE1 (Priority 3) and PSCCH/PSSCH transmission to UE2 (Priority 2), and UE3 determines to transmit PSCCH/PSSCH to UE2 due to priority ranking at slot #N. In the case that there are repetitions for PSFCH, PSCCH and PSSCH, for the retransmission process, UE3 will raise the priority (from Priority 3 to Priority 1) of retransmission of the channel that is determined to be not transmitted or received at collision (e.g., PSFCH from UE1). With the above embodiment, the priority of channel can be dynamically adjusted and the efficiency of transmission can be optimized globally.

Figure 13:
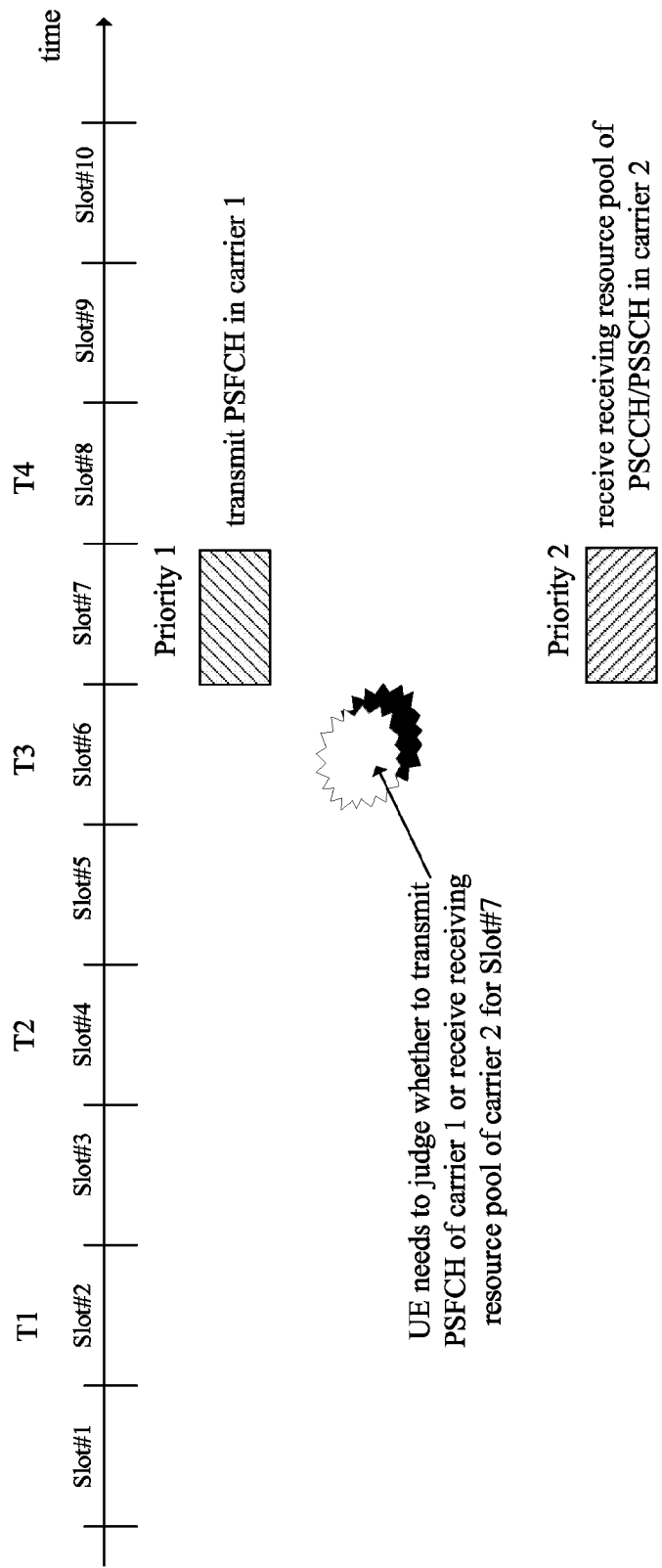
FIG. 13 schematically shows an exemplary scenario of resource allocation reference for a transmitting PSFCH and a receiving PSFCH according to an embodiment of the present disclosure.

FIG. 13 schematically shows an exemplary scenario of resource allocation reference for a transmitting PSFCH and a receiving PSFCH according to an embodiment of the present disclosure. Specifically, the priority of a channel to be transmitted (e.g., PSFCH in carrier 1) is determined based on the channel level, and the priority of a channel to be received (e.g., PSCCH/PSSCH in carrier 2) is determined based on the resource pool level. Here, resource pool may refer to the resource unit for a user equipment to transmit or receive channel (e.g., PSCCH, PSSCH or PSFCH). For example, a priority can be pre-configured by upper level in the receiving resource pool representing the priority of all channels (e.g., PSCCH and PSSCH) included in the receiving resource pool in carrier 2 as illustrated in FIG. 13, and UE determines whether to transmit PSFCH of carrier 1 or to receive receiving resource pool of carrier 2 for slot #7 by comparing the priority of PSFCH in channel level and the priority of PSCCH/PSSCH in resource pool level.

In an embodiment, the priority of a channel defined in channel level can be the same as or in a pre-configured relationship with the priority of said channel defined in channel level. That is to say the priority definition in resource pool level can be the same or comparable with that in channel level. In this way, the user equipment can have the same understanding on the priority of a channel to be transmitted (e.g., PSFCH) and the priority of a channel to be received (e.g., PSCCH/PSSCH) in different granularity level. For example, for PSFCH/PSCCH/PSSCH, the priority level can be defined by 0-7 (i.e., 8 levels in a decreasing order) and the resource pool can be defined by the same levels. The priority of certain PSFCH/PSCCH/PSSCH is comparable with that of certain resource pool. In an embodiment, the priorities in channel level and in resource pool level is pre-configured, configured, specified or any combination thereof in accordance with the standard.

Figure 14:
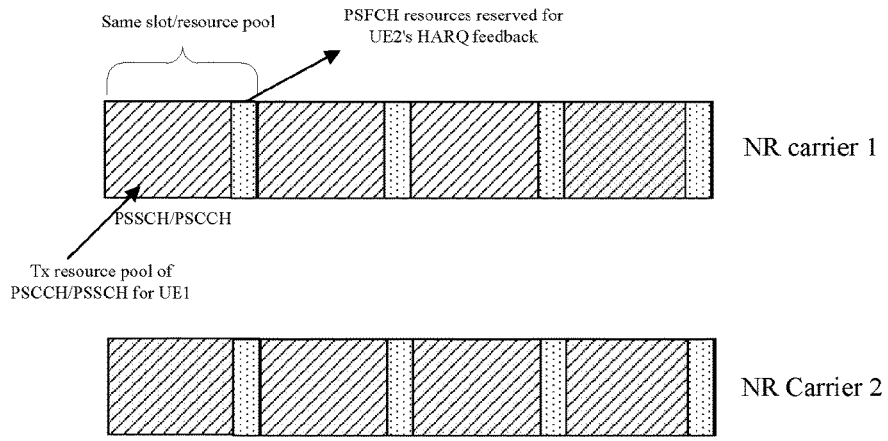
FIG. 14 schematically shows an example of NR carriers according to an embodiment of the present disclosure.

FIG. 14 schematically shows an example of NR carriers according to an embodiment of the present disclosure. In particular, in an embodiment, a user equipment comprises a transmitter, operative to transmit a PSCCH or PSSCH, and a receiver, operative to receive a PSFCH, wherein the PSFCH is allocated in same resource pool as that of the PSCCH or PSSCH. Here, the configuration of the user equipment can be the same as that of UE 100 in FIG. 5*a*.

As shown in FIG. 14, in the above embodiment, resource for transmission of the PSCCH/PSSCH and reception of the PSFCH can be allocated in the same slot or resource pool (or other timing unit depending on the granularity) without overlap in time domain. With the above embodiment, the user equipment can minimize the impact to the sensing process and resource selection of the PSSCH or PSCCH in the same carrier.

In an embodiment, the PSFCH is allocated in the symbol or symbols located in the end of a slot of the resource pool. With above embodiment, the indication for resource position of the PSFCH can be omitted, thereby resource overhead is optimized.

Figure 15:
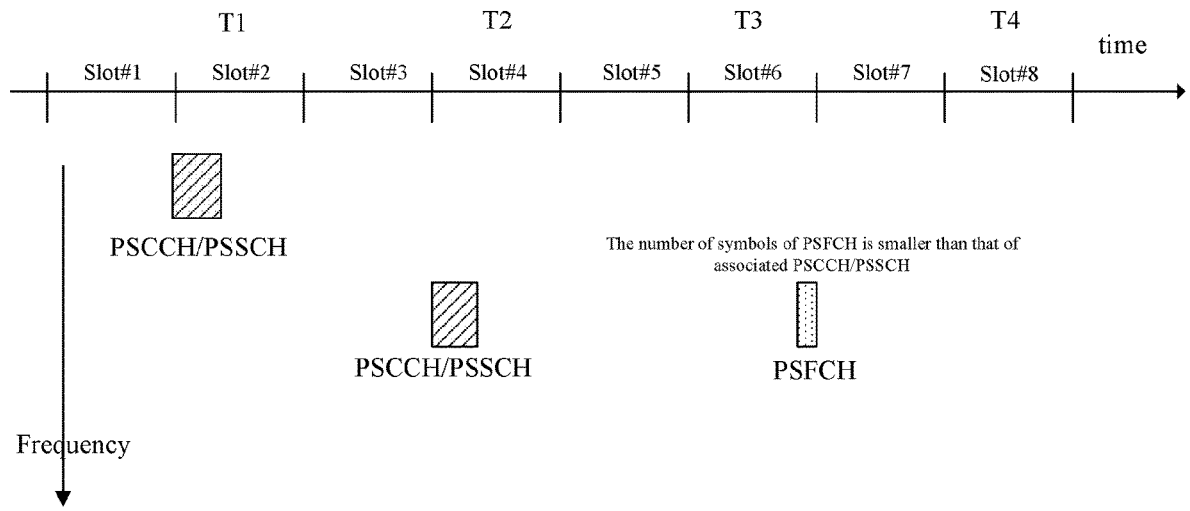
FIG. 15 schematically shows details of PSFCH according to an embodiment of the present disclosure.

In an embodiment as shown in FIG. 15, the number of symbols in the slot of the resource pool for the PSFCH is not larger than that for the PSCCH or PSSCH. In an embodiment, the number of symbols in the slot of the resource pool for the PSFCH is based on that for the PSCCH or PSSCH. For example, the number of symbols in the slot of the resource pool for PSFCH is 1, but the number of symbols in the slot of the resource pool for the PSCCH or PSSCH is 2 (i.e., proportional). In an embodiment, the number of symbols in the slot of the resource pool for the PSFCH may equal to the number of remaining slots in the resource pool other than the number of the slots in the resource pool for the associated PSCCH/PSSCH. With above embodiment, the configuration process on PSFCH resource can be simplified.

Figure 16:
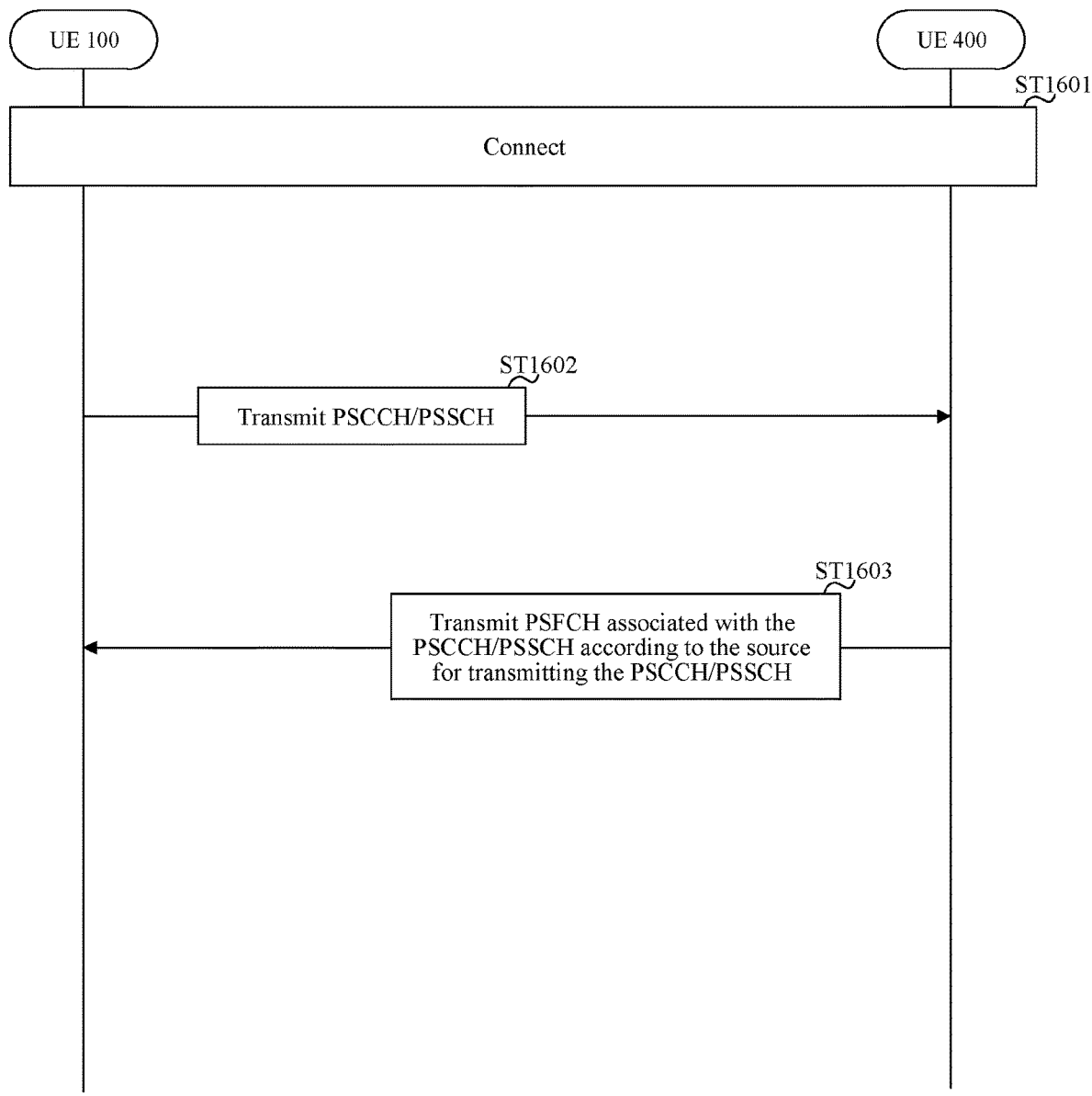
FIG. 16 schematically shows an example of a flowchart of communication between a transmitting user equipment and a receiving user equipment according to an embodiment of the present disclosure.

FIG. 16 schematically shows an example of a flowchart of communication between a transmitting user equipment and a receiving user equipment according to an embodiment of the present disclosure. In particular, an example of a flowchart of communication method between UE 100 in FIG. 5*a* or any one of the vehicles 101, 102 and 103 according to an embodiment of the present disclosure and another UE 400 is shown. Here, UE 400 can have the same configuration as UE 100.

As shown in FIG. 16, at a step of ST1601, the UE 100 and 400 may connect with each other in a connection procedure which is optional in embodiments of the present disclosure. The connection may be established by implementing known or future developed method whose details are omitted herein.

At a step of ST1602, UE 100 transmits a PSCCH/PSSCH to UE 400 via sidelink transmission. In response, at a step of ST1603, UE 400 transmits a PSFCH associated with the PSCCH/PSSCH according to the source for the PSCCH/PSSCH associated. That is to say, UE 100 receives PSFCH associated with the PSCCH/PSSCH according to the source for transmitting the PSCCH/PSSCH. Note that UE 100 may receive PSFCH associated with the PSCCH/PSSCH partially according to the source for transmitting the PSCCH/PSSCH.

With the procedure of the above embodiment of the present disclosure, the user equipment could receive the PSFCH in the resource determined based on the resource for transmitting the PSCCH or PSSCH, without need for the base station or user equipment to indicate resource position information of the PSFCH. In this way, the resource overhead becomes more efficient.

Figure 17:
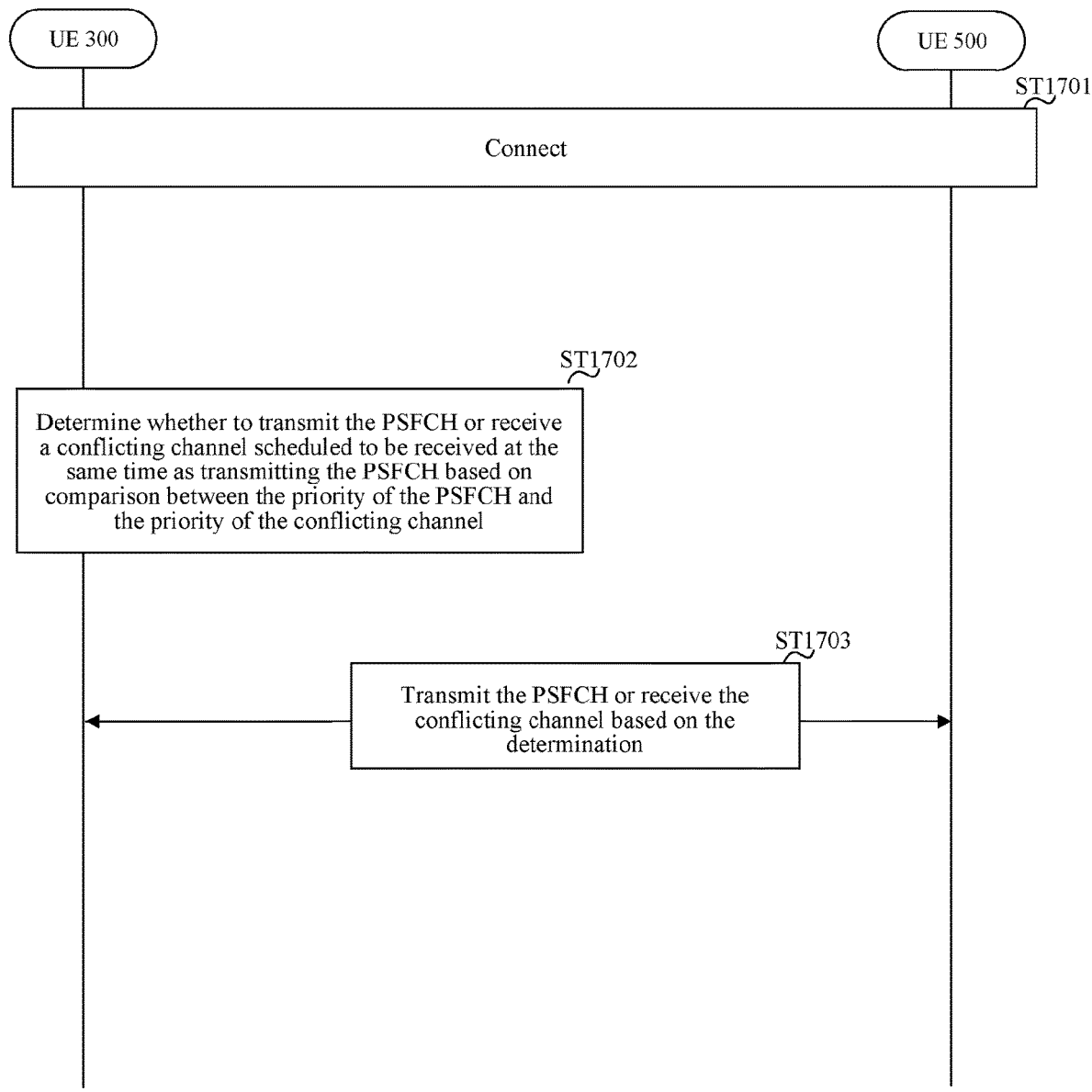
FIG. 17 schematically shows another example of a flowchart of communication between a transmitting user equipment and a receiving user equipment according to an embodiment of the present disclosure.

FIG. 17 schematically shows another example of a flowchart of communication between a transmitting user equipment and a receiving user equipment according to an embodiment of the present disclosure. In particular, an example of a flowchart of communication method between UE 300 in FIG. 9 or any one of the vehicles 101, 102 and 103 according to an embodiment of the present disclosure and another UE 500 is shown. Here, UE 500 can have the same configuration as UE 300.

As shown in FIG. 17, at a step of ST1701, the UE 300 and 500 may connect with each other in a connection procedure which is optional in embodiments of the present disclosure. The connection may be established by implementing known or future developed method whose details are omitted herein.

At a step of ST1702, UE 300 determines whether to transmit the PSFCH or receive a conflicting channel (e.g., PSCCH/PSSCH/PSFCH) scheduled to be received from UE 500 at the same time as transmitting the PSFCH based on comparison between the priority of the PSFCH and the priority of the conflicting channel (e.g., PSCCH/PSSCH/PSFCH) from UE 500. Specifically, when there will be collision between PSFCH transmission/reception and another channel, the UE 300 determines the process to be performed in advance. In the case of collision in time domain between PSFCH transmission and reception of another channel, for example PSCCH/PSSCH or PSFCH, the UE 300 determines whether to transmit the PSFCH or receive the conflicting channel scheduled based on comparison between the priority of the PSFCH and the priority of the conflicting channel, prior to the collision time. Then UE 300 can perform reception of PSFCH from UE 500 or transmission of the conflicting channel to UE 500 based on the determination in the step of ST1703. In an embodiment, there is no repetition for PSFCH transmission, since concerns of collision is address by the determination process prior to the collision.

With the above procedure, the user equipment according to the present disclosure is able to determine the transmission and reception of the PSFCH in order to prevent collision, even without repetitions of PSFCH, thereby reduce resources allocation for PSFCH.

In an embodiment, the priority of the PSFCH is determined based on the priority of the associated PSCCH or PSSCH, for example Priority 1 as shown. For example, in the above embodiment, the priority of the PSFCH to be transmitted is determined based on the priority of the associated PSCCH or PSSCH received by the UE 300, and the priority of the PSFCH to be received is determined based on the priority of the associated PSCCH or PSSCH transmitted from the UE 300.

In an embodiment, the resource for transmitting or receiving the PSFCH is determined according to the resource for receiving or transmitting the associated PSCCH or PSSCH. Specifically, the resource position for transmitting or receiving PSFCH can be determined by the resource position of the associated PSCCH/PSSCH received or transmitted, respectively, and resource position of initial/retransmission of the associated PSCCH/PSSCH in the case that there are repetitions for PSCCH/PSSCH transmission, as described in above embodiments with details omitted.

In an embodiment, the priority of transmission is prioritized over reception when the priority of the channel to be transmitted is the same as that of the channel to be received. Note that the priority of transmission and reception with the same priority may vary based on the different configurations.

Figure 18:
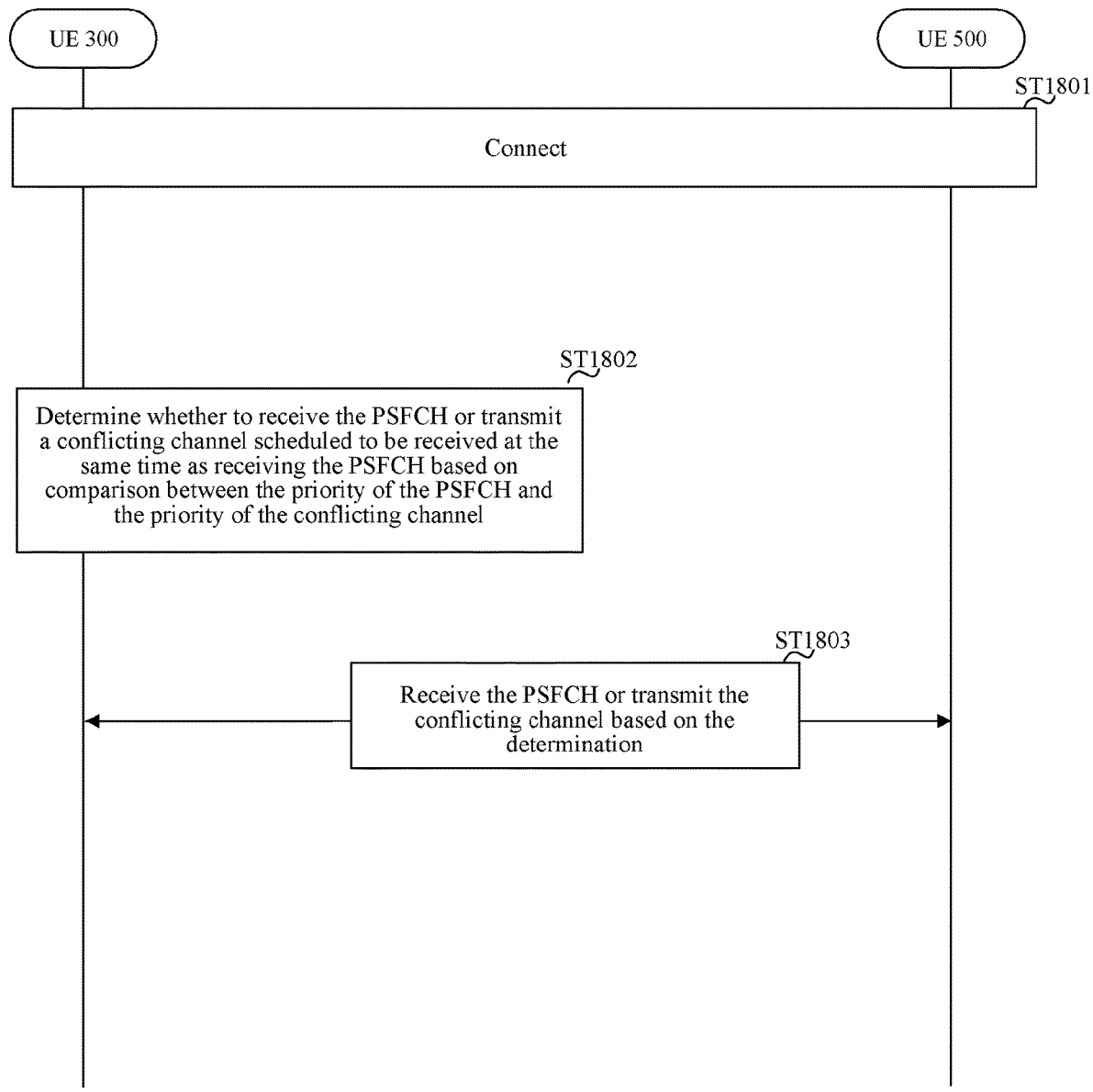
FIG. 18 schematically shows another example of a flowchart of communication between a transmitting user equipment and a receiving user equipment according to an embodiment of the present disclosure.

Similarly shown in FIG. 18, another example of a flowchart of communication between a transmitting user equipment and a receiving user equipment according to an embodiment of the present disclosure is provided. In particular, an example of a flowchart of communication method between UE 300 in FIG. 9 or any one of the vehicles 101, 102 and 103 according to an embodiment of the present disclosure and another UE 500 is shown. Here, UEs 300 and 500 can have the same configuration with UEs 300 and 500 in FIG. 17.

As shown in FIG. 18, at a step of ST1801, the UE 300 and 500 may connect with each other in a connection procedure which is optional in embodiments of the present disclosure. The connection may be established by implementing known or future developed method whose details are omitted herein.

At a step of ST1802, UE 300 determines whether to receive the PSFCH or transmit a conflicting channel (e.g., PSCCH/PSSCH/PSFCH) scheduled to be received from UE 500 at the same time as receiving the PSFCH based on comparison between the priority of the PSFCH and the priority of the conflicting channel (e.g., PSCCH/PSSCH/PSFCH) from UE 500. Specifically, when there will be collision between PSFCH transmission/reception and another channel, the UE 300 determines the process to be performed in advance. In the case of collision in time domain between PSFCH reception and transmission of another channel, for example PSCCH/PSSCH or PSFCH, the UE 300 determines whether to receive the PSFCH or transmit the conflicting channel scheduled based on comparison between the priority of the PSFCH and the priority of the conflicting channel, prior to the collision time. Once the UE 300 determines the process to be performed, then at a step of ST1803, UE 300 can perform reception of PSFCH from UE 500 or transmission of the conflicting channel to UE 500 based on the determination.

In an embodiment, the priority of the PSFCH is determined based on the priority of the associated PSCCH or PSSCH, for example Priority 1 as shown. For example, in the above embodiment, the priority of the PSFCH to be transmitted is determined based on the priority of the associated PSCCH or PSSCH received by the UE 300, and the priority of the PSFCH to be received is determined based on the priority of the associated PSCCH or PSSCH transmitted from the UE 300.

In an embodiment, the resource for transmitting or receiving the PSFCH is determined according to the resource for receiving or transmitting the associated PSCCH or PSSCH. Specifically, the resource position for transmitting or receiving PSFCH can be determined by the resource position of the associated PSCCH/PSSCH received or transmitted, respectively, and resource position of initial/retransmission of the associated PSCCH/PSSCH in the case that there are repetitions for PSCCH/PSSCH transmission, as described in above embodiments with details omitted.

In an embodiment, the priority of transmission is prioritized over reception when the priority of the channel to be transmitted is the same as that of the channel to be received. Note that the priority of transmission and reception with the same priority may vary based on the different configurations.

Figure 19:
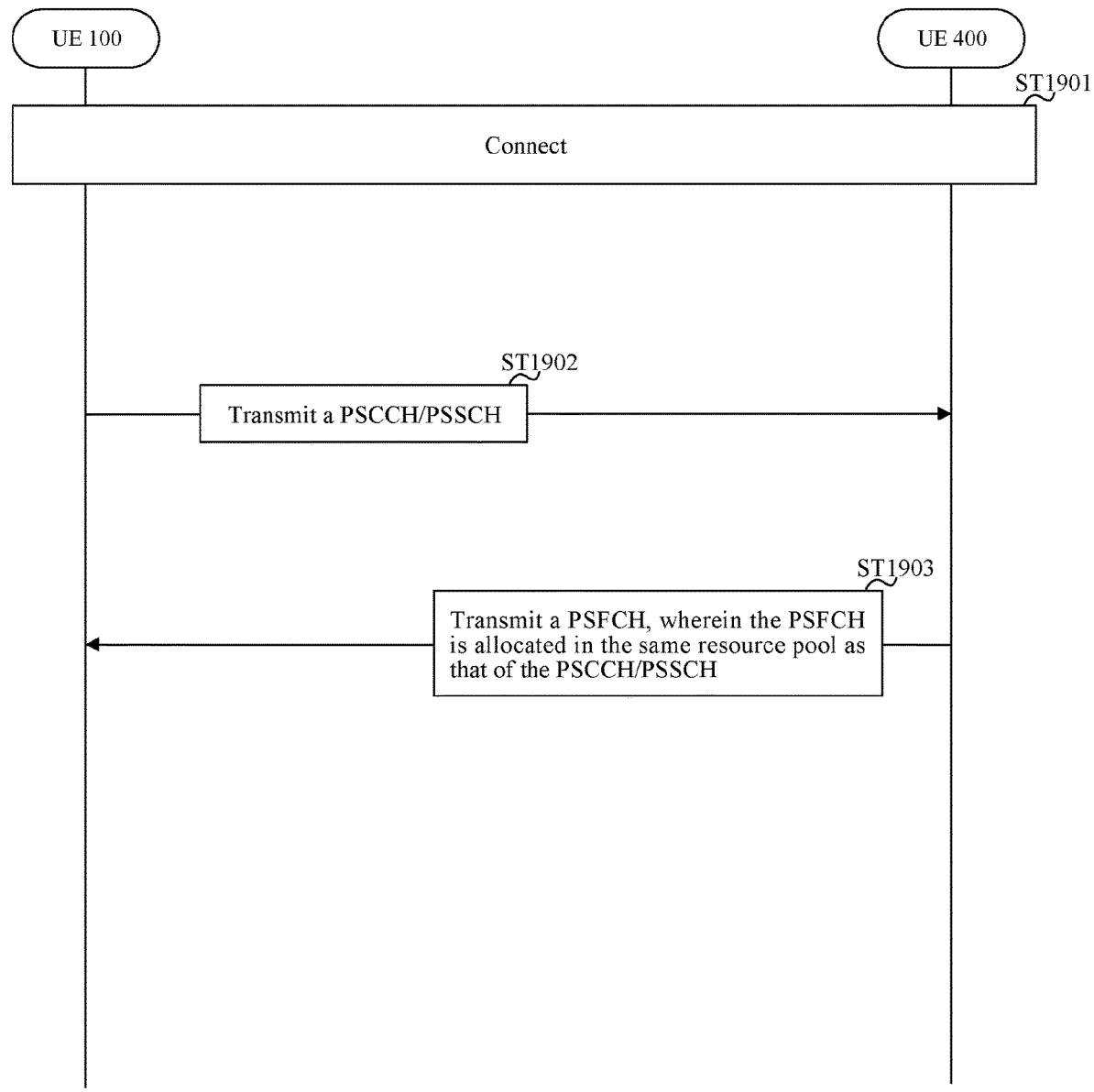
FIG. 19 schematically shows another example of a flowchart of communication between a transmitting user equipment and a receiving user equipment according to an embodiment of the present disclosure.

FIG. 19 schematically shows another example of a flowchart of communication between a transmitting user equipment and a receiving user equipment according to an embodiment of the present disclosure. In particular, an example of a flowchart of communication method between UE 100 in FIG. 5*a* or any one of the vehicles 101, 102 and 103 according to an embodiment of the present disclosure and another UE 400 is shown. Here, UE 400 can have the same configuration as UE 100.

As shown in FIG. 19, at a step of ST1901, the UE 300 and 500 may connect with each other in a connection procedure which is optional in embodiments of the present disclosure. The connection may be established by implementing known or future developed method whose details are omitted herein.

At a step of ST1902, UE 100 can transmit a PSCCH or PSSCH to UE 400. In response, at a step of ST1903, UE 400 transmits a PSFCH, wherein the PSFCH is allocated in the same resource pool as that of the PSCCH/PSSCH. That is to say, UE 100 receives a PSFCH, wherein the PSFCH is allocated in the same resource pool as that of the PSCCH/PSSCH.

In an embodiment, the PSFCH is allocated in the symbol or symbols located in the end of a slot of the resource pool. With above procedure, the indication for resource position of the PSFCH can be omitted, thereby resource overhead is optimized.

In an embodiment, the number of symbols in the slot of the resource pool for the PSFCH is not larger than that for the PSCCH or PSSCH. In an embodiment, the number of symbols in the slot of the resource pool for the PSFCH is based on that for the PSCCH or PSSCH. For example, the number of symbols in the slot of the resource pool for PSFCH is 1, but the number of symbols in the slot of the resource pool for the PSCCH or PSSCH is 2 (i.e., proportional). With above procedure, the configuration process on PSFCH resource can be simplified.

Figure 20:
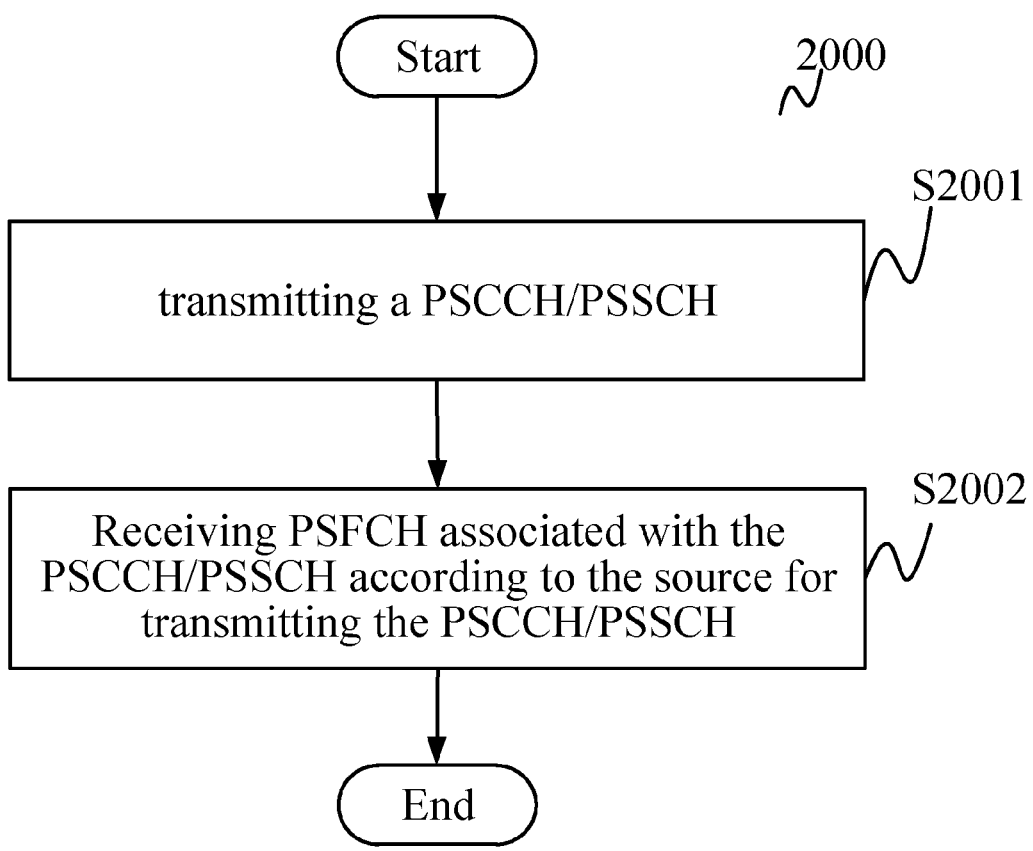
FIG. 20 illustrates an example of a flowchart of communication method performed by a user equipment according to an embodiment of the present disclosure.

FIG. 20 illustrates an example of a flowchart of communication method performed by a user equipment according to an embodiment of the present disclosure. For example, the wireless communication method 2000 may be applied to the UE 100 as shown in FIG. 5*a*.

As shown in FIG. 20, the wireless communication method 2000 starts at a step S2001, in which UE 100 transmits a PSCCH/PSSCH to a target UE via sidelink transmission. In response, at a step of S2002, UE 100 receives PSFCH associated with the PSCCH/PSSCH according to the source for transmitting the PSCCH/PSSCH. Note that UE 100 may receive PSFCH associated with the PSCCH/PSSCH partially according to the source for transmitting the PSCCH/PSSCH.

With the procedure of the above embodiment of the present disclosure, the user equipment could receive the PSFCH in the resource determined based on the resource for transmitting the PSCCH or PSSCH, without need for the base station or user equipment to indicate resource position information of the PSFCH. In this way, the resource overhead becomes more efficient.

FIG. 21 illustrates another example of a flowchart of communication between a transmitting user equipment and a receiving user equipment according to an embodiment of the present disclosure. For example, the wireless communication method 2000 may be applied to the UE 300 as shown in FIG. 9.

As shown in FIG. 21, the wireless communication method 2100 starts at a step S2101, UE 300 determines whether to transmit the PSFCH or receive a conflicting channel (e.g., PSCCH/PSSCH/PSFCH) scheduled to be received at the same time as transmitting the PSFCH based on comparison between the priority of the PSFCH and the priority of the conflicting channel (e.g., PSCCH/PSSCH/PSFCH). Specifically, when there will be collision between PSFCH transmission/reception and another channel, the UE 300 determines the process to be performed in advance. In the case of collision in time domain between PSFCH transmission and reception of another channel, for example PSCCH/PSSCH or PSFCH, the UE 300 determines whether to transmit the PSFCH or receive the conflicting channel scheduled based on comparison between the priority of the PSFCH and the priority of the conflicting channel, prior to the collision time. Then UE 300 can perform reception of PSFCH or transmission of the conflicting channel based on the determination in the step of S2102. In an embodiment, there is no repetition for PSFCH transmission, since concerns of collision is address by the determination process prior to the collision.

With the above procedure, the user equipment according to the present disclosure is able to determine the transmission and reception of the PSFCH in order to prevent collision, even without repetitions of PSFCH, thereby reduce resources allocation for PSFCH.

In an embodiment, the priority of the PSFCH is determined based on the priority of the associated PSCCH or PSSCH, for example Priority 1 as shown. For example, in the above embodiment, the priority of the PSFCH to be transmitted is determined based on the priority of the associated PSCCH or PSSCH received by the UE 300, and the priority of the PSFCH to be received is determined based on the priority of the associated PSCCH or PSSCH transmitted from the UE 300.

In an embodiment, the resource for transmitting or receiving the PSFCH is determined according to the resource for receiving or transmitting the associated PSCCH or PSSCH. Specifically, the resource position for transmitting or receiving PSFCH can be determined by the resource position of the associated PSCCH/PSSCH received or transmitted, respectively, and resource position of initial/retransmission of the associated PSCCH/PSSCH in the case that there are repetitions for PSCCH/PSSCH transmission, as described in above embodiments with details omitted.

In an embodiment, the priority of transmission is prioritized over reception when the priority of the channel to be transmitted is the same as that of the channel to be received. Note that the priority of transmission and reception with the same priority may vary based on the different configurations.

Similarly shown in FIG. 22, another example of a flowchart of communication between a transmitting user equipment and a receiving user equipment according to an embodiment of the present disclosure is provided. For example, the wireless communication method 2200 may be applied to the UE 300 as shown in FIG. 9.

As shown in FIG. 22, the wireless communication method 2200 starts at a step S2201, UE 300 determines whether to receive the PSFCH or transmit a conflicting channel (e.g., PSCCH/PSSCH/PSFCH) scheduled to be received at the same time as receiving the PSFCH based on comparison between the priority of the PSFCH and the priority of the conflicting channel (e.g., PSCCH/PSSCH/PSFCH). Specifically, when there will be collision between PSFCH transmission/reception and another channel, the UE 300 determines the process to be performed in advance. In the case of collision in time domain between PSFCH reception and transmission of another channel, for example PSCCH/PSSCH or PSFCH, the UE 300 determines whether to receive the PSFCH or transmit the conflicting channel scheduled based on comparison between the priority of the PSFCH and the priority of the conflicting channel, prior to the collision time. Once the UE 300 determines the process to be performed, then at a step of S2202, UE 300 can perform reception of PSFCH or transmission of the conflicting channel based on the determination.

With the above procedure, the user equipment according to the present disclosure is able to determine the transmission and reception of the PSFCH in order to prevent collision, even without repetitions of PSFCH, thereby reduce resources allocation for PSFCH.

In an embodiment, the priority of the PSFCH is determined based on the priority of the associated PSCCH or PSSCH, for example Priority 1 as shown. For example, in the above embodiment, the priority of the PSFCH to be transmitted is determined based on the priority of the associated PSCCH or PSSCH received by the UE 300, and the priority of the PSFCH to be received is determined based on the priority of the associated PSCCH or PSSCH transmitted from the UE 300.

In an embodiment, the resource for transmitting or receiving the PSFCH is determined according to the resource for receiving or transmitting the associated PSCCH or PSSCH. Specifically, the resource position for transmitting or receiving PSFCH can be determined by the resource position of the associated PSCCH/PSSCH received or transmitted, respectively, and resource position of initial/retransmission of the associated PSCCH/PSSCH in the case that there are repetitions for PSCCH/PSSCH transmission, as described in above embodiments with details omitted.

In an embodiment, the priority of transmission is prioritized over reception when the priority of the channel to be transmitted is the same as that of the channel to be received. Note that the priority of transmission and reception with the same priority may vary based on the different configurations.

Figure 23:
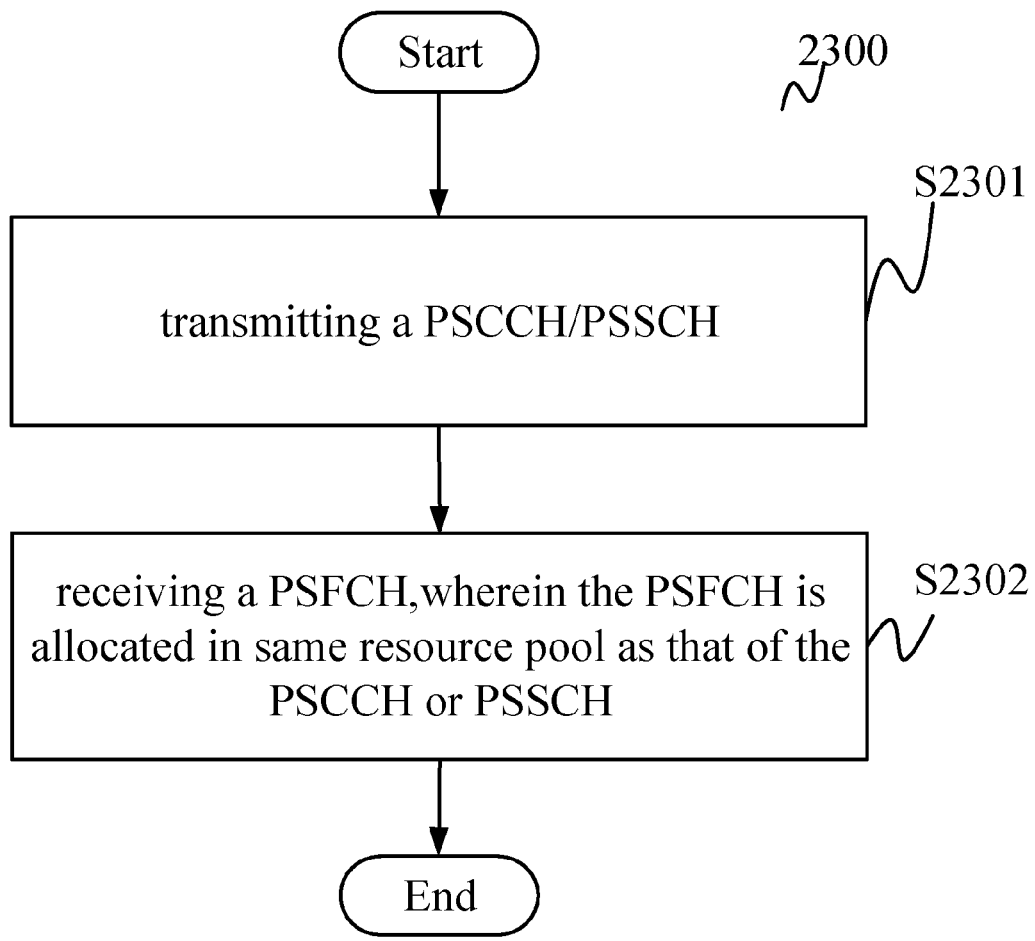
FIG. 23 illustrates another example of a flowchart of communication method performed by a user equipment according to an embodiment of the present disclosure.

FIG. 23 illustrates another example of a flowchart of communication between a transmitting user equipment and a receiving user equipment according to an embodiment of the present disclosure. For example, the wireless communication method 2300 may be applied to the UE 100 as shown in FIG. 5a.

In particular, an example of a flowchart of communication method between UE 100 in FIG. 5a or any one of the vehicles 101, 102 and 103 according to an embodiment of the present disclosure and another UE 400 is shown. Here, UE 400 can have the same configuration as UE 100.

As shown in FIG. 23, the wireless communication method 2200 starts at a step S2301, UE 100 can transmit a PSCCH or PSSCH to a target UE. In response, at a step of S2302, UE 100 receives a PSFCH, wherein the PSFCH is allocated in the same resource pool as that of the PSCCH/PSSCH. In an embodiment, the PSFCH is allocated in the symbol or symbols located in the end of a slot of the resource pool. With above procedure, the indication for resource position of the PSFCH can be omitted, thereby resource overhead is optimized.

In an embodiment, the number of symbols in the slot of the resource pool for the PSFCH is not larger than that for the PSCCH or PSSCH. In an embodiment, the number of symbols in the slot of the resource pool for the PSFCH is based on that for the PSCCH or PSSCH. For example, the number of symbols in the slot of the resource pool for PSFCH is 1, but the number of symbols in the slot of the resource pool for the PSCCH or PSSCH is 2 (i.e., proportional). With above procedure, the configuration process on PSFCH resource can be simplified.

Figure 24:
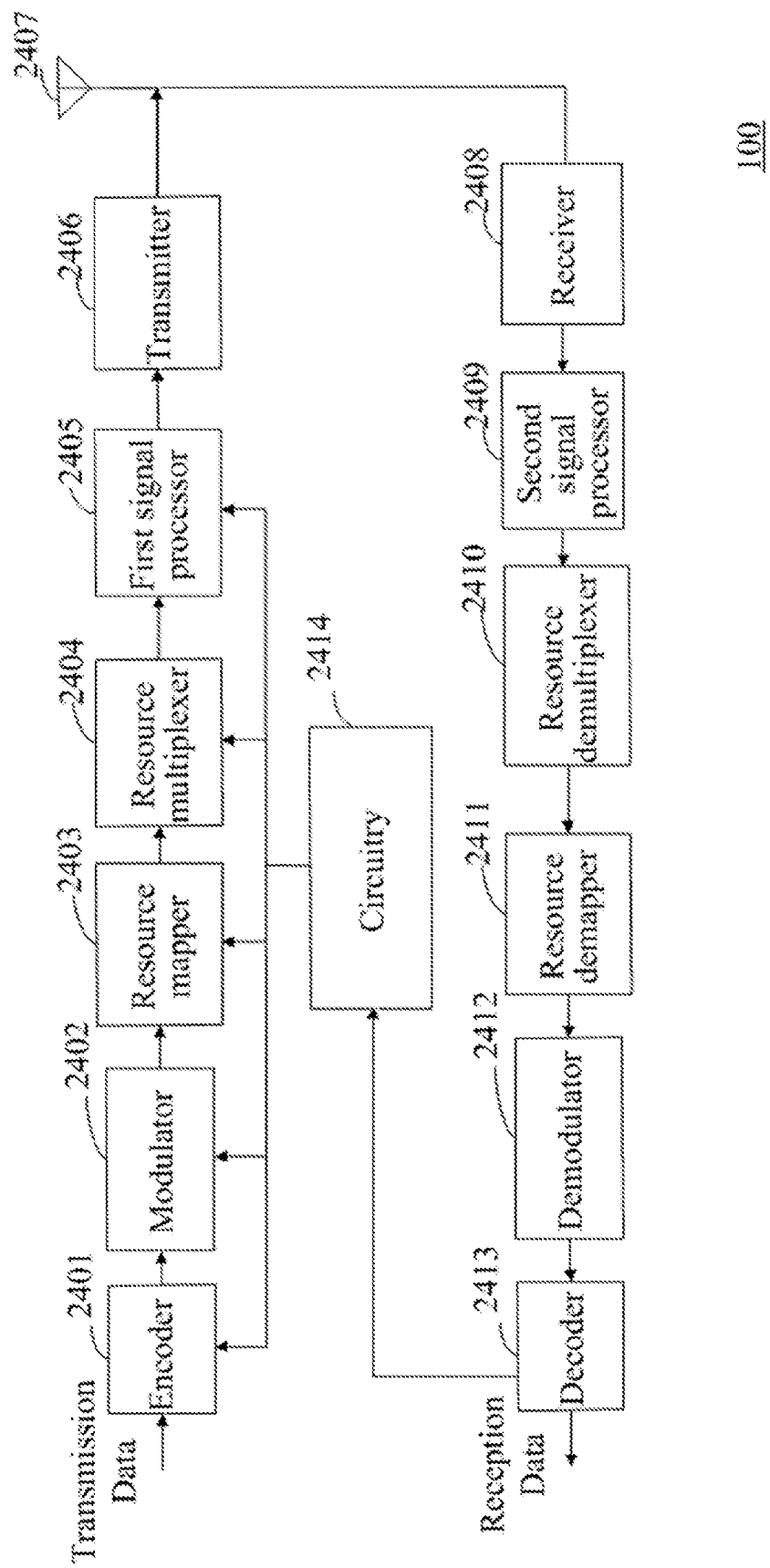
FIG. 24 systematically illustrates an example of a user equipment according to an embodiment of the present disclosure.

FIG. 24 systematically illustrates an example of a user equipment according to an embodiment of the present disclosure. As shown in FIG. 24, the UE 100 includes an encoder 2401, a modulator 2402, a resource mapper 2403, a resource multiplexer 2404, a first signal processor 2405, a transmitter 2406, an antenna 2407, a receiver 2408, a second signal processor 2409, a resource demultiplexer 2410, a resource demapper 2411, a demodulator 2412, a decoder 2413 and a circuitry 2414.

For example, the encoder 2401 performs encoding processing on transmission data, and the modulator 2402 performs modulation processing on post-encoding transmission data to generate a data symbol. The resource mapper 2403 maps sidelink data symbol onto physical resources. The resource multiplexer 2404 multiplexes the data symbol and possible control information and/or synchronization information. The first signal processor 2405 performs the signal processing on the multiplexed signal output from the resource multiplexer 2404. Here, the encoding, modulation, mapping, multiplexing and signal processing process performed by the encoder 2401, modulator 2402, resource mapper 2403, resource multiplexer 2404, and first signal processor 2405 respectively, are under control of the circuitry 2414, wherein, the controlling is at least partially according to the reception of the PSCCH/PSSCH as will be described below. The transmitter 2406 transmits the processed sidelink signal (e.g., PSCCH, PSSCH and/or PSFCH) to for example another UE via the antenna 2407.

In addition, the receiver 2408 may receive a sidelink signal (e.g., PSCCH, PSSCH and/or PSFCH) from another UE via the antenna 2407. The second signal processor 2409 performs the signal processing on the sidelink signal received by the receiver 2408. The resource demultiplexer 2410 demultiplexes the processed sidelink signal into sidelink data and possible sidelink control information and/or synchronization information. The resource demapper 2411 demaps sidelink data symbol and possible sidelink control information and/or synchronization information from physical resources. The demodulator 2412 performs demodulation processing on the sidelink data symbol and the decoder 2413 performs decoding processing on the demodulated sidelink data symbol to obtain the reception data. In addition, the demodulator 2412 may also performs demodulation processing on possible sidelink control information and/or synchronization information and the decoder 2413 performs decoding processing on the demodulated sidelink control information and/or synchronization information so as to output the sidelink control information and/or synchronization information for controlling sidelink transmission and reception. For example, when PSCCH/PSSCH is received by the receiver 2408, once the PSCCH/PSSCH is signal processed, demultiplexed, demapped, demodulated, and decoded, the resource position information, gap information in-between the initial transmission and retransmission, etc., are feedback to the circuitry 2414 for controlling the encoder 2401, modulator 2402, resource mapper 2403, resource multiplexer, and first signal processor 2405 for PSFCH transmission.

The above case may correspond to unlicensed carrier case, as described before, in which there is no Uu communication; however, the present disclosure is not limited thereto. In a licensed carrier case, the UE 2400 may transmit uplink signals to a base station (for example, the BS 200 shown in FIG. 1) through the encoder 2401, the modulator 2402, the resource mapper 2403, the resource multiplexer 2404, the first signal processor 2405, the transmitter 2406, and the antenna 2407.

Figure 25:
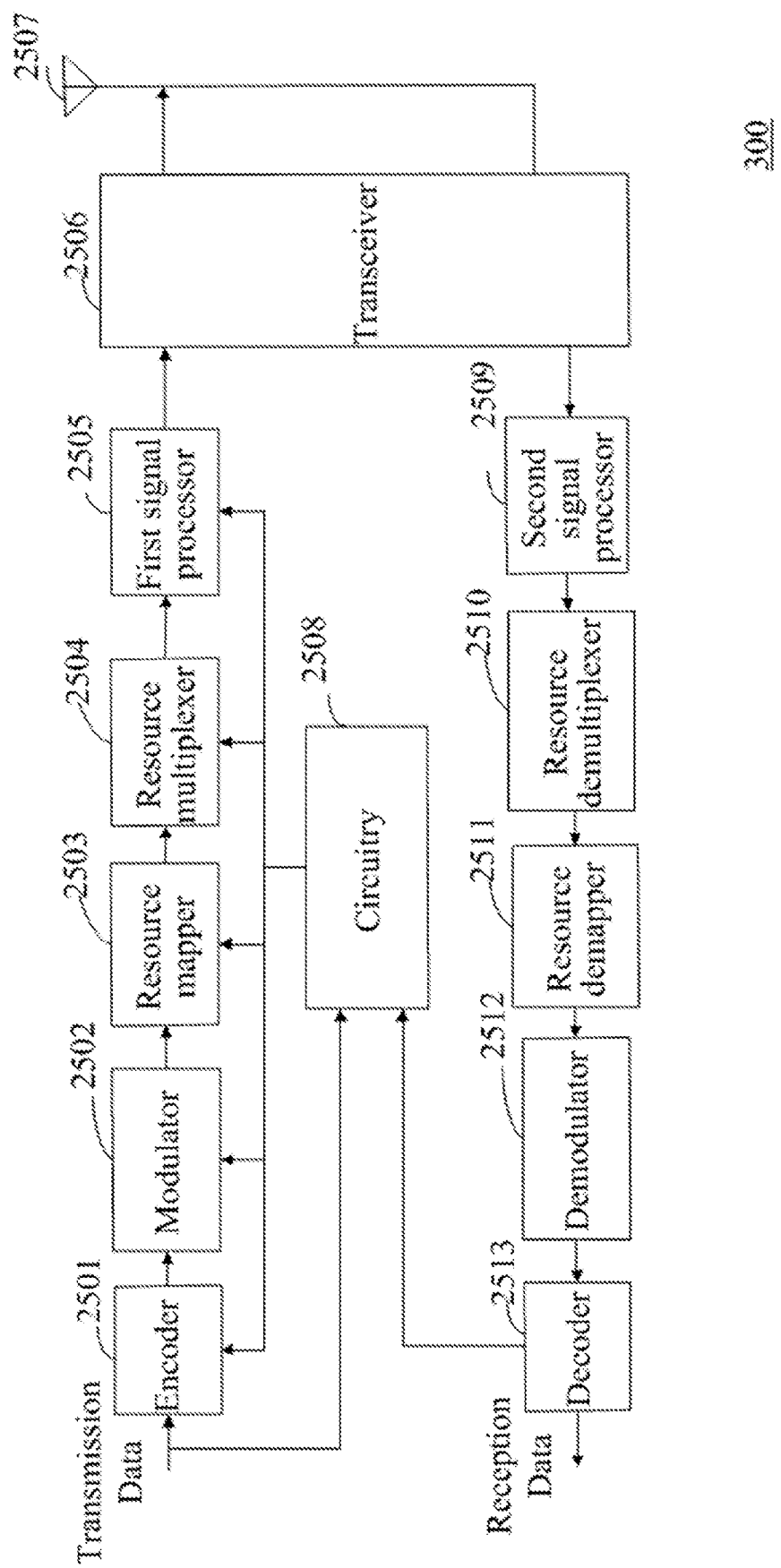
FIG. 25 systematically illustrates another example of a user equipment according to an embodiment of the present disclosure.

FIG. 25 systematically illustrates another example of a user equipment according to an embodiment of the present disclosure. As shown in FIG. 25, the UE 300 includes an encoder 2501, a modulator 2502, a resource mapper 2503, a resource multiplexer 2504, a first signal processor 2505, a transceiver 2506, an antenna 2507, a second signal processor 2509, a resource demultiplexer 2510, a resource demapper 2511, a demodulator 2512, a decoder 2513, and a circuitry 2508.

For example, the encoder 2501 performs encoding processing on transmission data, and the modulator 2502 performs modulation processing on post-encoding transmission data to generate a data symbol. The resource mapper 2503 maps sidelink data symbol onto physical resources. The resource multiplexer 2504 multiplexes the data symbol and possible control information and/or synchronization information. The first signal processor 2505 performs the signal processing on the multiplexed signal output from the resource multiplexer 2504. The transceiver 2506 transmits the processed sidelink signal (e.g., PSCCH, PSSCH and/or PSFCH) or receives the processed sidelink signal (e.g., PSCCH, PSSCH and/or PSFCH) to or from for example another UE via the antenna 2507.

In addition, the circuitry 2508 may determine whether transceiver 2506 will transmit/receive a PSFCH or receive/transmit a conflicting channel (e.g., PSCCH, PSSCH and/or PSFCH), based on the priority thereof received from transmission data and reception data, via controlling the encoding, modulation, mapping, multiplexing and signal processing process performed by the encoder 2501, modulator 2502, resource mapper 2503, resource multiplexer 2504, and first signal processor 2505 respectively.

Further, the second signal processor 2509 performs the signal processing on the sidelink signal received by the transceiver 2506. The resource demultiplexer 2510 demultiplexes the processed sidelink signal into sidelink data and possible sidelink control information and/or synchronization information. The resource demapper 2511 demaps sidelink data symbol and possible sidelink control information and/or synchronization information from physical resources. The demodulator 2512 performs demodulation processing on the sidelink data symbol and the decoder 2513 performs decoding processing on the demodulated sidelink data symbol to obtain the reception data. In addition, the demodulator 2512 may also performs demodulation processing on possible sidelink control information and/or synchronization information and the decoder 2513 performs decoding processing on the demodulated sidelink control information and/or synchronization information so as to output the sidelink control information and/or synchronization information for controlling sidelink transmission and reception.

The above case may correspond to unlicensed carrier case, as described before, in which there is no Uu communication; however, the present disclosure is not limited thereto. In a licensed carrier case, the UE 2500 may transmit uplink signals to a base station (for example, the BS 200 shown in FIG. 1) through the encoder 2501, the modulator 2502, the resource mapper 2503, the resource multiplexer 2504, the first signal processor 2505, the transceiver 2506, and the antenna 2507.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Embodiments of the present disclosure can at least provide the following subject matters:

(1). A user equipment, comprising:
a transmitter, operative to transmit a Physical Sidelink Control Channel (PSCCH) or Physical Sidelink Shared Channel (PSSCH); and
a receiver, operative to receive a Physical Sidelink Feedback Channel (PSFCH) associated with the transmitted PSCCH or PSSCH in a resource determined at least partially according to the resource for transmitting the PSCCH or PSSCH.

(2). The user equipment according to (1), wherein
the resource in time domain for the PSFCH is in a gap of one or more symbols or slots from the resource in time domain for the associated PSCCH or PSSCH, and
the resource in frequency domain for the PSFCH is in a gap of one or more Physical Resource Blocks (PRBs) from the resource in frequency domain for the associated PSCCH or PSSCH,
wherein the number of symbols or slots is pre-configured, configured, specified or any combination thereof, and
the number of PRBs is pre-configured, configured, specified or any combination thereof.

(3). The user equipment according to (1) or (2), wherein
the PSFCH and the PSCCH or PSSCH are transmitted with repetitions, and
the number of repetitions for PSFCH is the same as or in a relation derived from that for the associated PSCCH or PSSCH.

(4). The user equipment according to (3), wherein
the at least one of the starting slot and Physical Resource Block (PRB) of the resource for the initial transmission of the PSFCH is indicated by Sidelink Control Indicator (SCI) received by the user equipment.

(5). The user equipment according to (3), wherein
the at least one of the starting slot and Physical Resource Block (PRB) of the resource for the initial transmission of the PSFCH is determined by resource position of initial transmission of the associated PSCCH or PSSCH.

(6). The user equipment according to (3), wherein
the at least one of the starting slot and Physical Resource Block (PRB) of the resource for the initial transmission of the PSFCH is determined by resource position of retransmission of the associated PSCCH or PSSCH.

(7). The user equipment according to any one of (3)-(5), wherein
the timing gap between the PSFCH and its repetition is the same as the timing gap between the associated PSCCH or PSSCH and its repetition.

(8). The user equipment according to any one of (3)-(5), wherein
the frequency gap between the PSFCH transmission and its repetition is the same as the frequency gap between the associated PSCCH or PSSCH and its repetition.

(9). A user equipment, comprising:
a transceiver, operative to transmit a first Physical Sidelink Feedback Channel (PSFCH) associated with a received Physical Sidelink Control Channel (PSCCH) or Physical Sidelink Shared Channel (PSSCH), or receive a second PSFCH associated with a transmitted PSCCH or PSSCH; and
circuitry, operative to
determine whether to transmit the first PSFCH or receive a first conflicting channel scheduled to be received at the same time as transmitting the first PSFCH based on comparison between the priority of the first PSFCH and the priority of the first conflicting channel, or
determine whether to receive the second PSFCH or transmit a second conflicting channel scheduled to be transmitted arrive at the same time as receiving the second PSFCH based on comparison between the priority of the second PSFCH and the priority of the second conflicting channel.

(10). The user equipment according to (9), wherein there is no repetition for PSFCH transmission.

(11). The user equipment according to (9) or (10), wherein the priority of a channel to be transmitted is determined based on the channel level, and
the priority of a channel to be received is determined based on the resource pool level.

(12). The user equipment according to (9), wherein the priority of the first PSFCH is determined based on the priority of the received associated PSCCH or PSSCH, or
the priority of the second PSFCH is determined based on the priority of the transmitted associated PSCCH or PSSCH.

(13). The user equipment according to (9) or (10), wherein transmission is prioritized over reception when the priority of the channel to be transmitted is the same as that of the channel to be received.

(14). The user equipment according to (9) or (10), wherein the resource for transmitting the first PSFCH or receiving the second PSFCH is determined according to the resource for receiving or transmitting the associated PSCCH or PSSCH.

(15). A user equipment, comprising:
a transmitter, operative to transmit a Physical Sidelink Control Channel (PSCCH) or Physical Sidelink Shared Channel (PSSCH); and
a receiver, operative to receive a Physical Sidelink Feedback Channel (PSFCH),
wherein the PSFCH is allocated in same resource pool as that of the PSCCH or PSSCH.

(16). The user equipment according to (15), wherein the PSFCH is allocated in the symbol or symbols located in the end of a slot of the resource pool.

(17). The user equipment according to (15) or (16), wherein
the number of symbols in the slot of the resource pool for the PSFCH is not larger than that for the PSCCH or PSSCH.

(18). A wireless communication method for a user equipment, comprising:
transmitting a Physical Sidelink Control Channel (PSCCH) or Physical Sidelink Shared Channel (PSSCH); and
receiving a Physical Sidelink Feedback Channel (PSFCH) associated with the transmitted PSCCH or PSSCH in a resource determined at least partially according to the resource for transmitting the PSCCH or PSSCH.

(19). The wireless communication method according to (18), wherein
the resource in time domain for the PSFCH is in a gap of one or more symbols or slots from the resource in time domain for the associated PSCCH or PSSCH, and
the resource in frequency domain for the PSFCH is in a gap of one or more Physical Resource Blocks (PRBs) from the resource in frequency domain for the associated PSCCH or PSSCH,
wherein the number of symbols or slots is pre-configured, configured, specified or any combination thereof, and
the number of PRBs is pre-configured, configured, specified or any combination thereof.

(20). The wireless communication method according to (18) or (19), wherein
the PSFCH and the PSCCH or PSSCH are transmitted with repetitions, and
the number of repetitions for PSFCH is the same as or in a relation derived from that for the associated PSCCH or PSSCH.

(21). The wireless communication method according to (20), wherein
the at least one of the starting slot and Physical Resource Block (PRB) of the resource for the initial transmission of the PSFCH is indicated by Sidelink Control Indicator (SCI) received by the user equipment.

(22). The wireless communication method according to (20), wherein
the at least one of the starting slot and Physical Resource Block (PRB) of the resource for the initial transmission of the PSFCH is determined by resource position of initial transmission of the associated PSCCH or PSSCH.

(23). The wireless communication method according to (20), wherein
the at least one of the starting slot and Physical Resource Block (PRB) of the resource for the initial transmission of the PSFCH is determined by resource position of retransmission of the associated PSCCH or PSSCH.

(24). The wireless communication method according to any one of (20)-(22), wherein
the timing gap between the PSFCH and its repetition is the same as the timing gap between the associated PSCCH or PSSCH and its repetition.

(25). The wireless communication method according to any one of (20)-(22), wherein
the frequency gap between the PSFCH transmission and its repetition is the same as the frequency gap between the associated PSCCH or PSSCH and its repetition.

(26). A wireless communication method for a user equipment, comprising:
determining whether to transmit a first Physical Sidelink Feedback Channel (PSFCH) associated with a received Physical Sidelink Control Channel (PSCCH) or Physical Sidelink Shared Channel (PSSCH) or receive a first conflicting channel scheduled to be received at the same time as transmitting the first PSFCH based on comparison between the priority of the first PSFCH and the priority of the first conflicting channel, and transmitting the first PSFCH or receiving the first conflicting channel based on the determination, or
determining whether to receive a second PSFCH associated with a transmitted PSCCH or PSSCH or transmit a second conflicting channel scheduled to be transmitted arrive at the same time as receiving the second PSFCH based on comparison between the priority of the second PSFCH and the priority of the second conflicting channel, and receiving the second PSFCH or transmitting the second conflicting channel based on the determination.

(27). The wireless communication method according to (26), wherein
there is no repetition for PSFCH transmission.

(28). The wireless communication method according to (26) or (27), wherein
the priority of a channel to be transmitted is determined based on the channel level, and
the priority of a channel to be received is determined based on the resource pool level.

(29). The wireless communication method according to (26), wherein
the priority of the first PSFCH is determined based on the priority of the received associated PSCCH or PSSCH, or the priority of the second PSFCH is determined based on the priority of the transmitted associated PSCCH or PSSCH.

(30). The wireless communication method according to (26) or (27), wherein
transmission is prioritized over reception when the priority of the channel to be transmitted is the same as that of the channel to be received.

(31). The wireless communication method according to (26) or (27), wherein
the resource for transmitting the first PSFCH or receiving the second PSFCH is determined according to the resource for receiving or transmitting the associated PSCCH or PSSCH.

(32). A wireless communication method for a user equipment, comprising:
transmitting a Physical Sidelink Control Channel (PSCCH) or Physical Sidelink Shared Channel (PSSCH); and
receiving a Physical Sidelink Feedback Channel (PSFCH),
wherein the PSFCH is allocated in same resource pool as that of the PSCCH or PSSCH.

(33). The wireless communication method according to (32), wherein
the PSFCH is allocated in the symbol or symbols located in the end of a slot of the resource pool.

(34). The wireless communication method according to (32) or (33), wherein
the number of symbols in the slot of the resource pool for the PSFCH is not larger than that for the PSCCH or PSSCH.

The invention claimed is:

1. A user equipment, comprising:
a transmitter, operative to transmit a Physical Sidelink Control Channel (PSCCH) or Physical Sidelink Shared Channel (PSSCH); and
a receiver, operative to receive a Physical Sidelink Feedback Channel (PSFCH) associated with the transmitted PSCCH or PSSCH in a resource determined at least partially according to the resource for transmitting the PSCCH or PSSCH,
wherein each of a plurality of sets of Physical Resource Blocks (PRBs) for PSFCH resources is associated with resources used for PSCCH or PSSCH transmission,
a set of PRBs used for individual PSFCH transmissions is selected from the plurality of sets of PRBs based on a user equipment identifier (UE ID), and
a priority of the PSFCH is determined based on a priority of the transmitted PSCCH or PSSCH, and the receiver receives the PSFCH instead of another PSFCH concurrently transmitted with the PSFCH in case the priority of the PSFCH is higher than a priority of the another PSFCH concurrently transmitted with the PSFCH.

2. The user equipment according to claim 1, wherein
the resource in a time domain for the PSFCH is in a gap of one or more symbols or slots from a resource in the time domain for the associated PSCCH or PSSCH, and
the resource in a frequency domain for the PSFCH is in a gap of one or more PRBs from a resource in the frequency domain for the associated PSCCH or PSSCH,
wherein a number of the one or more symbols or slots is pre-configured, configured, specified, or any combination thereof, and
a number of the one or more PRBs is pre-configured, configured, specified, or any combination thereof.

3. The user equipment according to claim 1, wherein
the PSFCH and the PSCCH or PSSCH are transmitted with repetitions, and
a number of repetitions for the PSFCH is the same as or in a relation derived from that for the associated PSCCH or PSSCH.

4. The user equipment according to claim 3, wherein
at least one of a starting slot or a PRB of a resource for an initial transmission of the PSFCH is indicated by a Sidelink Control Indicator (SCI) received by the user equipment.

5. The user equipment according to claim 3, wherein
at least one of a starting slot or a PRB of a resource for an initial transmission of the PSFCH is determined by a resource position of an initial transmission of the associated PSCCH or PSSCH.

6. The user equipment according to claim 3, wherein
at least one of a starting slot or a PRB of a resource for an initial transmission of the PSFCH is determined by a resource position of a retransmission of the associated PSCCH or PSSCH.

7. The user equipment according to claim 3, wherein
a timing gap between the PSFCH and its repetition is the same as a timing gap between the associated PSCCH or PSSCH and its repetition.

8. The user equipment according to claim 3, wherein
a frequency gap between the PSFCH and its repetition is the same as a frequency gap between the associated PSCCH or PSSCH and its repetition.

9. A wireless communication method for a user equipment, comprising:
transmitting a Physical Sidelink Control Channel (PSCCH) or Physical Sidelink Shared Channel (PSSCH); and
receiving a Physical Sidelink Feedback Channel (PSFCH) associated with the transmitted PSCCH or PSSCH in a resource determined at least partially according to the resource for transmitting the PSCCH or PSSCH,
wherein each of a plurality of sets of Physical Resource Blocks (PRBs) for PSFCH resources is associated with resources used for PSCCH or PSSCH transmission,
a set of PRBs used for individual PSFCH transmissions is selected from the plurality of sets of PRBs based on a user equipment identifier (UE ID), and
a priority of the PSFCH is determined based on a priority of the transmitted PSCCH or PSSCH, and the PSFCH is received instead of another PSFCH concurrently transmitted with the PSFCH in case the priority of the PSFCH is higher than a priority of the another PSFCH concurrently transmitted with the PSFCH.

* * * * *